US010956750B2

(12) United States Patent
Vo et al.

(10) Patent No.: US 10,956,750 B2
(45) Date of Patent: Mar. 23, 2021

(54) SYSTEM AND METHOD FOR AUTOMATED TABLE GAME ACTIVITY RECOGNITION

(71) Applicant: SenSen Networks Group Pty Ltd, Abbotsford (AU)

(72) Inventors: Nhat Dinh Minh Vo, Abbotsford (AU); Subhash Challa, Abbotsford (AU); Zhi Li, Abbotsford (AU)

(73) Assignee: SenSen Networks Group Pty Ltd, Abbotsford (AU)

( * ) Notice: Subject to any disclaimer, the term of this patent is extended or adjusted under 35 U.S.C. 154(b) by 0 days.

(21) Appl. No.: 16/301,959

(22) PCT Filed: May 16, 2017

(86) PCT No.: PCT/AU2017/050452
§ 371 (c)(1),
(2) Date: Nov. 15, 2018

(87) PCT Pub. No.: WO2017/197452
PCT Pub. Date: Nov. 23, 2017

(65) Prior Publication Data
US 2020/0034629 A1  Jan. 30, 2020

(30) Foreign Application Priority Data
May 16, 2016 (AU) ................................ 2016901829

(51) Int. Cl.
*G06K 9/00* (2006.01)
*A63F 1/04* (2006.01)
(Continued)

(52) U.S. Cl.
CPC ............ *G06K 9/00771* (2013.01); *A63F 1/04* (2013.01); *A63F 1/067* (2013.01); *A63F 1/18* (2013.01);
(Continued)

(58) Field of Classification Search
CPC .............. G07F 17/322; G07F 17/3225; G07F 17/3293; G06K 9/00771; A63F 1/18;
(Continued)

(56) References Cited

U.S. PATENT DOCUMENTS 6,663,490 B2 * 12/2003 Soltys ................ G06Q 10/0639
463/25
10,032,335 B2  7/2018 Shigeta
(Continued)

FOREIGN PATENT DOCUMENTS

| WO | WO-2004/112923 | 12/2004 |
| WO | WO-2015/107902 | 7/2015 |
| WO | WO-2016/058085 | 4/2016 |

OTHER PUBLICATIONS

Extended European Search Report dated Dec. 3, 2019 in European Application No. 17 79 8397.
(Continued)

*Primary Examiner* — Brandon J Miller
(74) *Attorney, Agent, or Firm* — Harness, Dickey & Pierce, P.L.C.

(57) ABSTRACT

Some embodiments relate to a system for automated gaming recognition, the system comprising: at least one image sensor configured to capture image frames of a field of view including a table game; at least one depth sensor configured to capture depth of field images of the field of view; and a computing device configured to receive the image frames and the depth of field images, and configured to process the received image frames and depth of field images in order to produce an automated recognition of at least one gaming state appearing in the field of view. Embodiments also relate to methods and computer-readable media for automated gaming recognition. Further embodiments relate to methods and systems for monitoring game play and/or gaming events on a gaming table.

13 Claims, 24 Drawing Sheets

(51) Int. Cl.
  *A63F 1/06* (2006.01)
  *A63F 1/18* (2006.01)
  *G07F 17/32* (2006.01)
(52) U.S. Cl.
  CPC ........ *G07F 17/322* (2013.01); *G07F 17/3225* (2013.01); *G07F 17/3293* (2013.01)
(58) Field of Classification Search
  CPC .......... A63F 1/067; A63F 1/04; A63F 13/213; G06T 7/174; G06T 7/55
  See application file for complete search history.

(56) References Cited

U.S. PATENT DOCUMENTS

| | | | |
|---|---|---|---|
| 10,529,183 B2 | 1/2020 | Shigeta | |
| 10,540,846 B2 | 1/2020 | Shigeta | |
| 10,580,254 B2 | 3/2020 | Shigeta | |
| 10,593,154 B2 | 3/2020 | Shigeta | |
| 10,600,282 B2 | 3/2020 | Shigeta | |
| 10,741,019 B2 | 8/2020 | Shigeta | |
| 10,748,378 B2 | 8/2020 | Shigeta | |
| 10,755,524 B2 | 8/2020 | Shigeta | |
| 10,762,745 B2 | 9/2020 | Shigeta | |
| 2003/0096645 A1 | 5/2003 | Soltys et al. | |
| 2005/0026680 A1 | 2/2005 | Gururajan | |
| 2007/0077987 A1 | 4/2007 | Gururajan et al. | |
| 2008/0113783 A1 | 5/2008 | Czyzewski et al. | |
| 2009/0233699 A1* | 9/2009 | Koyama | G07F 17/322 463/25 |
| 2012/0100901 A1 | 4/2012 | Kirsch | |
| 2016/0335837 A1* | 11/2016 | Shigeta | G07F 17/3248 |
| 2016/0371917 A1* | 12/2016 | Yang | G07F 17/3204 |
| 2017/0024616 A1* | 1/2017 | Bousquet | G06T 7/174 |
| 2017/0069159 A1* | 3/2017 | Vikranth | G06Q 10/087 |
| 2017/0161987 A1* | 6/2017 | Bulzacki | G06K 9/0053 |
| 2018/0232987 A1 | 8/2018 | Shigeta | |
| 2019/0251784 A1 | 8/2019 | Shigeta | |
| 2019/0251785 A1 | 8/2019 | Shigeta | |
| 2019/0251786 A1 | 8/2019 | Shigeta | |
| 2019/0333326 A1 | 10/2019 | Shigeta | |
| 2019/0340873 A1 | 11/2019 | Shigeta | |
| 2019/0392680 A1 | 12/2019 | Shigeta | |
| 2020/0265672 A1 | 8/2020 | Shigeta | |

OTHER PUBLICATIONS

International Search Report dated Aug. 4, 2017 in International Application No. PCT/AU2017/050452.
Written Opinion dated Aug. 4, 2017 in International Application No. PCT/AU2017/050452.
Office Action dated Sep. 22, 2020 in Chilean Application No. 201803251.

* cited by examiner

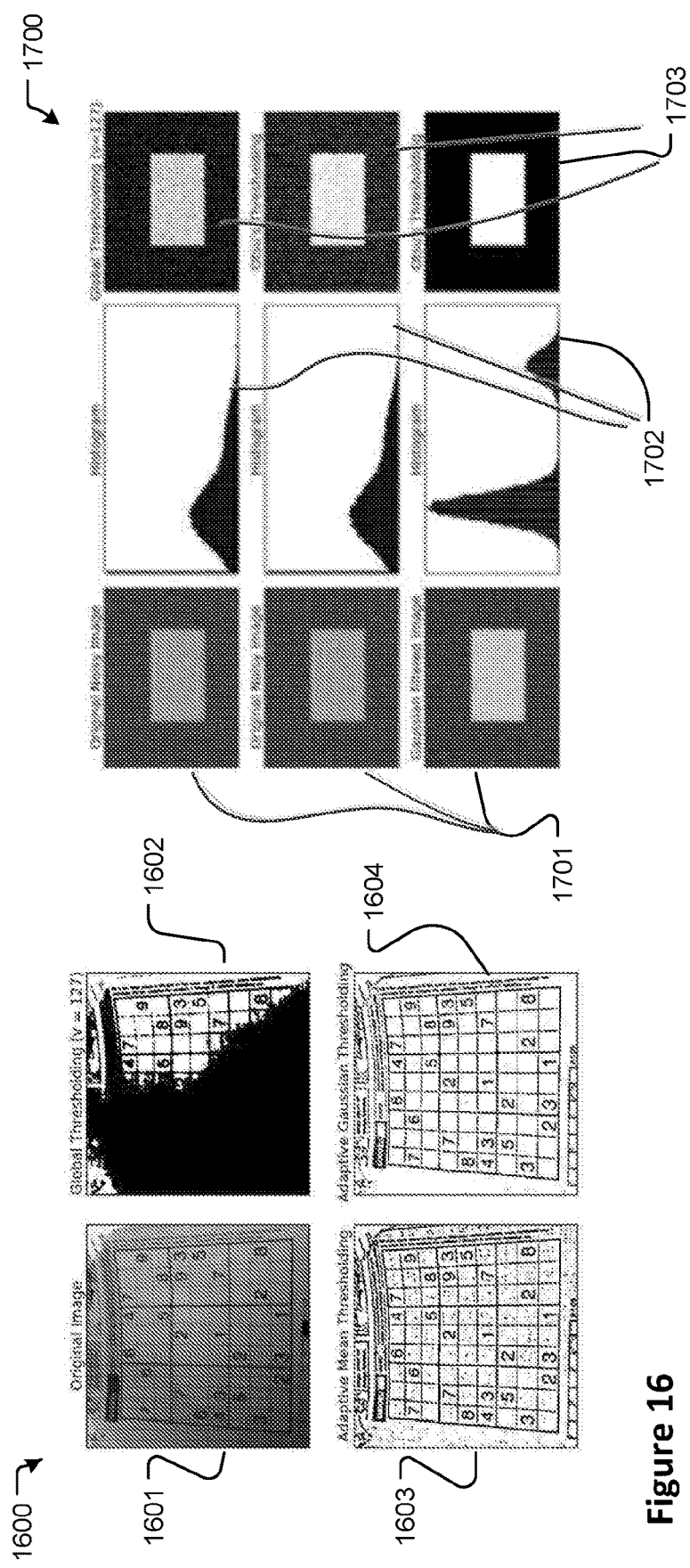
Figure 17
Figure 16
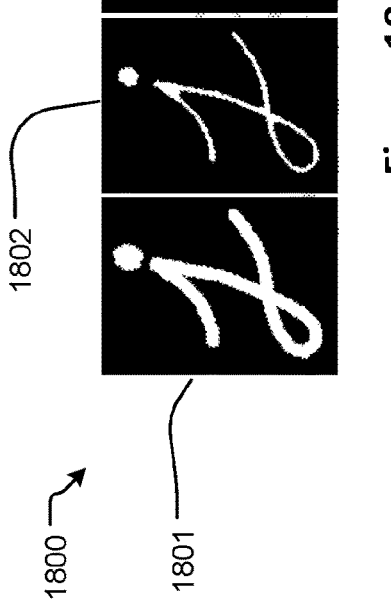
Figure 18

SYSTEM AND METHOD FOR AUTOMATED TABLE GAME ACTIVITY RECOGNITION

CROSS-REFERENCE TO RELATED APPLICATIONS

This application is the National Stage Application of International Application No. PCT/AU2017/050452, filed May 16, 2017, which claims priority to Australian Patent Application No. 2016901829, filed on May 16, 2016, the entire contents of each of which are incorporated herein by reference.

TECHNICAL FIELD

The described embodiments relate generally to monitoring table games. In particular, embodiments relate to systems and methods for monitoring events in table games at gaming venues.

BACKGROUND

Casinos and other such venues are now using surveillance technology and other management software in an effort to monitor players and plan their business strategy. They seek to deploy real-time behaviour analytics, algorithms (or processes), and player tracking techniques to maximise player revenue, optimise staffing and optimise the allocation of venue floor space to the types of games which maximise venue revenue. Most casino-goers participate in loyalty programs which require them to use player cards instead of coins, paper money, or tickets. This has given casinos the opportunity to record and analyse individual gambling behaviour, create player profiles and record such things as the amount each gambler bets, their wins and losses, and the rate at which they push slot machine buttons. However, table games are less easily monitored than either slot machines or button operated gaming machines.

Systems for monitoring and managing table games have typically proven to be expensive to install and maintain, and have failed to achieve the accuracy levels which are needed to be truly useful. Other options include having sensors in the casino chips and other offline yield management solutions, however these have proven ineffective. The operating environment of gaming venues is fast paced, with high amounts of visual and auditory noise and distractions, cards and betting chips can be in disordered positions on the table, and illumination can vary considerably.

Casinos or other such gaming venues conduct several table based games such as Baccarat, Blackjack, Roulette that involve players betting on occurrence or non-occurrence of specific events. Individual games have their own set of defined events that initiate the game, determine the result of bets placed during the game or terminate a game. Most games are conducted by a designated dealer who undertakes certain actions specific to each game that may initiate a game, trigger events that determine the result of bets placed or terminate a game.

Casinos and other such gaming venues have an interest in ascertaining transactional data associated with events occurring on gaming tables or playing surfaces. This information may assist in the planning of the Casino's business strategy and monitoring behaviour of players. Information regarding the events and outcomes of games on tables may form a basis for Casinos to ascertain optimal staffing, floor space allocation to specific games and other such revenue enhancing or patron experience-enhancing decisions. One method of ascertaining transactional data associated with events occurring on gaming tables employed by Casinos is random sampling by individuals who visually inspect the events occurring on a subset of tables and report the observed information. The reported information may be extrapolated to estimate the overall level of activity on tables in the Casino. However, such visual inspection occurs at intervals of an hour or more and relies on human judgement, so there can be inefficiencies with such methods.

Systems for monitoring and managing table games have typically proven to be expensive to install and maintain, and have failed to achieve the accuracy levels which are needed to be truly useful. Other options include having sensors in the casino chips and other offline yield management solutions, however these have proven ineffective. The operating environment of gaming venues is fast paced, with high amounts of visual and auditory noise and distractions, cards and betting chips can be in disordered positions on the table, and illumination can vary considerably.

It is desired to address or ameliorate one or more shortcomings or disadvantages associated with prior techniques for monitoring events in table games at gaming venues, or to at least provide a useful alternative.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In this specification, a statement that an element may be "at least one of" a list of options is to be understood that the element may be any one of the listed options, or may be any combination of two or more of the listed options.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

According to a first aspect some embodiments provides a system for automated gaming recognition, the system comprising: at least one image sensor configured to capture image frames of a field of view including a table game; at least one depth sensor configured to capture depth of field images of the field of view; and a computing device configured to receive the image frames and the depth of field images, and configured to process the received image frames and depth of field images in order to produce an automated recognition of at least one gaming state appearing in the field of view.

According to a second aspect some embodiments provide a method of automated gaming recognition, the method comprising: obtaining image frames of a field of view including a table game; obtaining depth of field images of the field of view; and processing the received image frames and depth of field images in order to produce an automated recognition of at least one gaming state appearing in the field of view.

According to a further aspect some embodiments provide a non-transitory computer readable medium for automated gaming recognition, comprising instructions which, when executed by one or more processors, causes performance of the following: obtaining image frames of a field of view including a table game; obtaining depth of field images of the field of view; and processing the received image frames and depth of field images in order to produce an automated recognition of at least one gaming state appearing in the field of view.

The image frames may comprise images within or constituting the visible spectrum, or may comprise infrared or ultraviolet images. The depth of field images may comprise time of flight data points for the field of view, and/or phase information data points reflecting depth of field. The at least one gaming state appearing in the field of view may comprise one or more or all of: game start; chip detection; chip value estimation, chip stack height estimation; and game end. Game start and/or game end may be effected by card detection or dolly detection. The table game may be a card game such as poker, blackjack or baccarat, or a non-card based game such as roulette.

Some embodiments relate to a method of monitoring game play on a table surface of a gaming table, the method comprising: analysing in real time captured images of the table surface to identify a presence of a game object in any one of a plurality of a first pre-defined regions of interest on the table surface; in response to a game object being identified as present in the any one of a plurality of the first pre-defined regions of interest, recording a time stamp for a game event; and transmitting game event data to a server, the game event data comprising the time stamp, an indication of the gaming event and an identifier of the any one of a plurality of the first pre-defined regions of interest.

The game object may be a game card or a position marker. The analysing may comprise identifying a presence of at least one wager object on the table surface. The at least one wager object may be different from the game object. The presence of the at least one wager object may be identified in one or more of a plurality of second pre-defined regions of interest. The analysing may comprise identifying one or more groups of wager objects in the one or more second pre-defined regions of interest.

The analysing may further comprise: estimating a height of each of the one or more groups of wager object with respect to the table surface; and estimating a number of wager objects present in each group of wager objects. The analysing may further comprise identifying a colour of an upper-most one of each group of wager objects.

The method may further comprise automatically estimating a wager amount associated with each second pre-defined region of interest in which the presence of at least one wager object is identified, wherein the estimating is based on the identified colour of the upper-most wager object of each group of wager objects and the estimated number of wager objects in each group of wager objects in the respective second region of interest.

The captured images may comprise multi-spectral images and the analysing may further comprise multi frame processing of the multi-spectral images to identify the presence of the game object in any one of the plurality of the first pre-defined regions of interest or second pre-defined regions of interest on the table surface.

Some embodiments relate to a system of monitoring game play on a table surface of a gaming table, the system comprising: at least one camera configured to capture images of a table surface; and a computing device in communication with the camera, said computing device configured to analyse in real time captured images of the table surface to automatically identify a presence of a game object in any one of a plurality of a first pre-defined regions of interest on the table surface.

The game object may be a game card or a position marker, for example. The computing device may configured to identify a presence of at least one of wager object on the table surface. The at least one of wager object may be different from the game object. The presence of the at least one wager object is identified by the computing device in one or more of a plurality of second pre-defined regions of interest. The computing device may configured to identify one or more groups of wager objects in the one or more second pre-defined regions of interest.

The at least one camera may further comprise a depth sensing device to communicate to the computing device depth data of the game objects with respect to the table surface. The computing device may be further configured to estimate a height of each of the one or more groups of wager object with respect to the table surface. The computing device may be further configured to estimate a number of wager objects present in each group of wager objects. The computing device may be further configured to identify a colour of an upper-most one of each group of wager objects.

The computing device may configured to automatically estimate a wager amount associated with each second pre-defined region of interest in which the presence of at least one wager object is identified, wherein the estimating is based on the identified colour of the upper-most wager object of each group of wager objects and the estimated number of wager objects in each group of wager objects in the respective second region of interest.

The captured images may comprise multi-spectral images and the computing device may configured to perform multi-frame processing of the multi-spectral images to identify the presence of the game object in any one of the plurality of the first pre-defined regions of interest or second pre-defined regions of interest on the table surface.

Some embodiments relate to a system for automated monitoring gaming events on a gaming table comprising: a depth imaging device configured to capture depth of a plurality of game objects on a gaming region of the gaming table; a plurality of visual imaging cameras configured to capture visual images of the gaming region; a gaming configuration module comprising: configuration data associated with a plurality of games, configuration of the gaming table, location of regions of interest, patterns to recognise game objects, and definition of gaming events as a change in state of game objects on the gaming table; and a computer system that receives data from the depth imaging device and the plurality of visual imaging cameras, and is configured to access the configuration data in the gaming configuration module to automatically recognise objects on the gaming region and gaming events occurring during a game.

The methods described herein may be fully automated, so that game activity monitoring can occur without any need for human judgement or intervention. However, some human interaction can occur in system configuration steps, such as establishing regions of interest for betting and for locating game objects, like cards or dollys.

BRIEF DESCRIPTION OF DRAWINGS

FIG. 16 is a set of images to illustrate the results of several types of thresholding operations on a sample image.

FIG. 17 is a set of images to illustrate the results of further types of thresholding operations on a sample image.

FIG. 18 is a set of images to illustrate the results of erosion and dilation operations on a sample image.

DETAILED DESCRIPTION

Described embodiments relate generally to monitoring table games. In particular, embodiments relate to systems and methods for monitoring events in table games at gaming venues.

Figure 1:
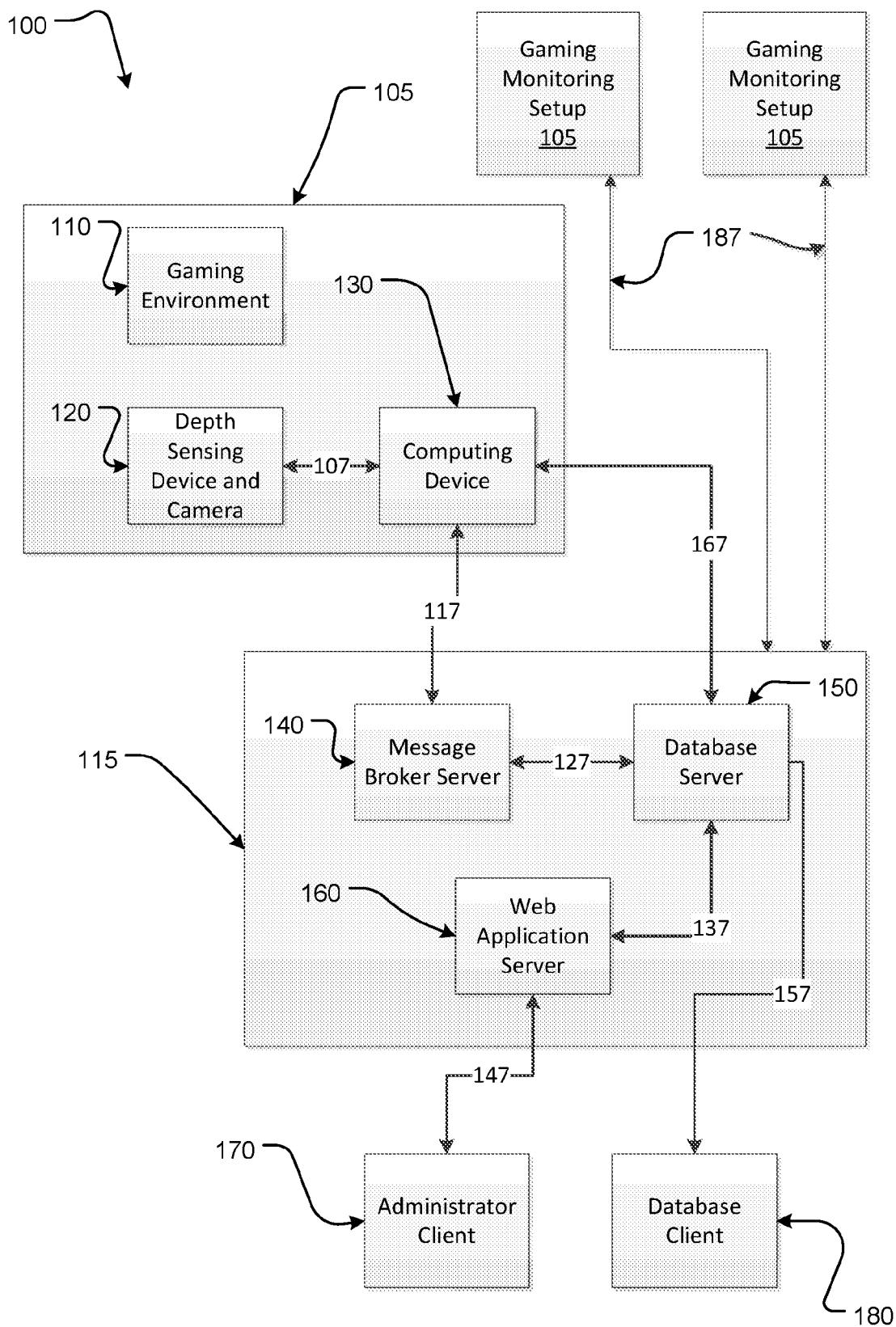
FIG. 1 is a block diagram of a Gaming Monitoring System.

Gaming Monitoring System: FIG. 1 is a block diagram of a Gaming Monitoring System 100 according to some embodiments. The system 100 may comprise a plurality of Gaming Monitoring Setups 105, a Gaming Monitoring Infrastructure 115, an Administrator Client 170 and a Database Client 180. The Gaming Monitoring Setup 105 comprises a Gaming Environment 110, a Depth Sensing Device and Camera 120 and a Computing Device 130. The system 100 is suited for installation and operation in a one or more gaming rooms of a gaming venue, such as a casino. The gaming rooms each have one or multiple gaming tables located therein and some or each of those tables may form part of a respective Gaming Monitoring setup 105. Commercially available devices such as Microsoft™ Kinect or Asus™ Xtion or an Infineon™ 3 D Image Sensor REAL3™ other similar depth sensing devices with camera functions can be employed as a Depth Sensing Device and Camera, for example. The depth sensing device and camera 120 is coupled with or connected to a Computing Device 130 to receive instructions from the Computing Device 130 and transmit recorded data to the Computing Device 130 using a link 107. For example, a Microsoft™ Kinect device may be connected to a Computing Device using a USB port on the Computing Device.

A gaming venue may have multiple Gaming Environments, for example an area or room where table games are played, and to monitor each one of those Gaming Environments, there may be multiple ones of Gaming Monitoring Setup 105. Multiple Gaming Monitoring Setups 105 may be coupled or linked with a common Gaming Monitoring Infrastructure 115 using a network link 187. The network link 187 comprises network link 117 between the Computing Device 130 and a Message Broker Server 140; and a network link 167 between a Database Server 150 and the Computing Device 130. The Gaming Monitoring Infrastructure 115 may also be coupled with or linked to Gaming Monitoring Setups 105 in two or more different gaming venues. In some embodiments where a gaming venue may have a large number of Gaming Environments 110, multiple ones of Gaming Monitoring Infrastructure 115 may be coupled with different subsets of Gaming Monitoring Setups 105 in the same venue.

The Gaming Monitoring Infrastructure 115 comprises the Message Broker Server 140, the Database Server 150, and a Web Application Server 160. The Message Broker Server 140 may be connected to a plurality of Computing Devices 130 through the two way Network Link 117. Network link 127 may exist between the Message Broker Server 140 and the Database Server 150 to enable the transfer of data or instructions. Network link 137 may exist between the Web Application Server 160 and the Database Server 150 to enable the transfer of data or instructions. Each of the servers 140, 150 and 160 may be implemented as standalone servers or may be implemented as distinct virtual servers on one or more physical servers or may be implemented in a cloud computing service. Each of the servers 140, 150 and 160 may also be implemented through a network of more than one servers configured to handle increased performance or high availability requirements.

The Administrator Client 170 may be an end user computing device such as a Computer or a Tablet, for example and may be connected to the Web Application Server 160 through the Network Link 147. The Database Client 180 may be an end user computing device or an interface to relay data to other end user computing devices or other databases and may be connected to the Database Server 150 through the Network Link 157.

Figure 2:
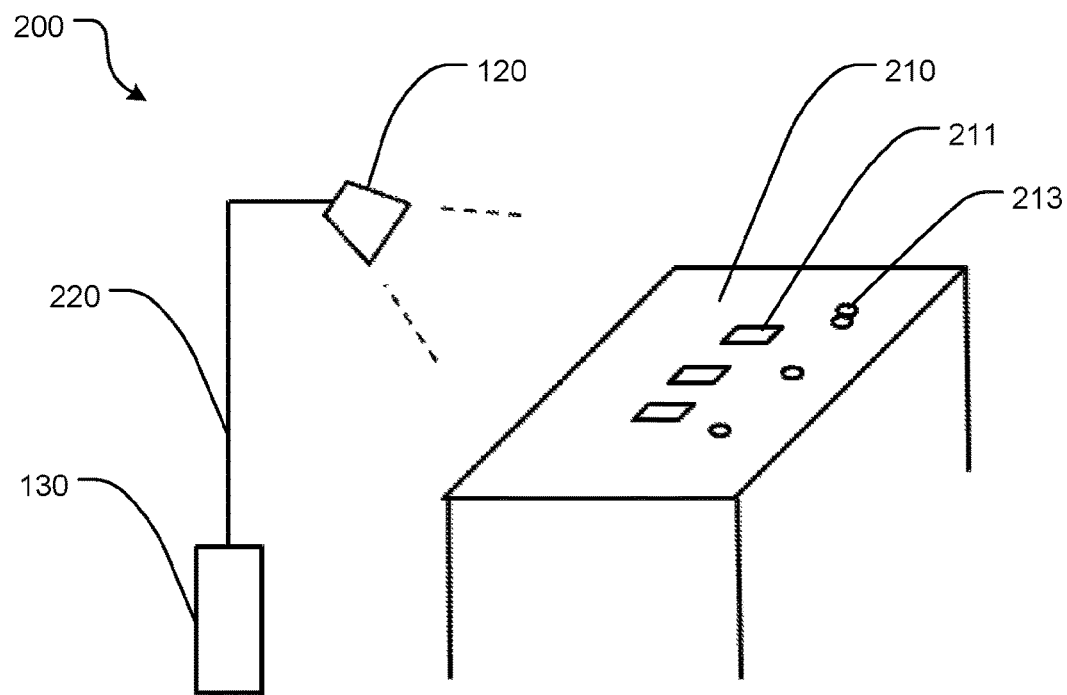
FIG. 2 is a schematic diagram of a system for automated table gaming recognition, forming part of the Gaming Monitoring System of FIG. 1.

Gaming Environment:

Configuration of a Gaming Environment 110 may vary depending on a specific game being conducted, but most games monitored by any one of the embodiments have common elements. FIG. 2 illustrates a system for automated table gaming recognition 200 in accordance with some embodiments. The main functions of the system of the presently described embodiment of the invention is to detect when a game starts and finishes, to detect a location of placed chips, and to estimate the value and the height (how many chips) of chip stack. This system is based on a combination of image processing techniques and sensing device features.

The Gaming Environment 110 comprises a playing surface or a gaming table 210 over and on which the game is conducted. The playing surface 210 is commonly a substantially horizontal planar surface and may have placed thereon various game objects, such as cards 211 or chips 213 or other objects, that may be detected by the Gaming Monitoring System 100. The depth sensing device and camera 120 may be mounted on a pillar or post 220 at a height so as to position the depth sensing device and camera 120 above any obstructions in the field of view of the depth sensing device and angled to direct the field of view of the depth sensing device and camera 120 somewhat downwardly towards the gaming table 210. The obstructions may be temporary obstructions, such as a dealer conducting a game at a table or a participant of a game or a passer-by, for example. In some embodiments, the depth sensing device or camera 120 may be positioned behind and above the dealers' shoulders to get an unobstructed view of a playing surface of the gaming table 210. The position of the depth sensing device or camera 120 and the computing device 130 may be above or adjacent to other display screens on a pillar or post that are located at that gaming table 210.

Figure 3:
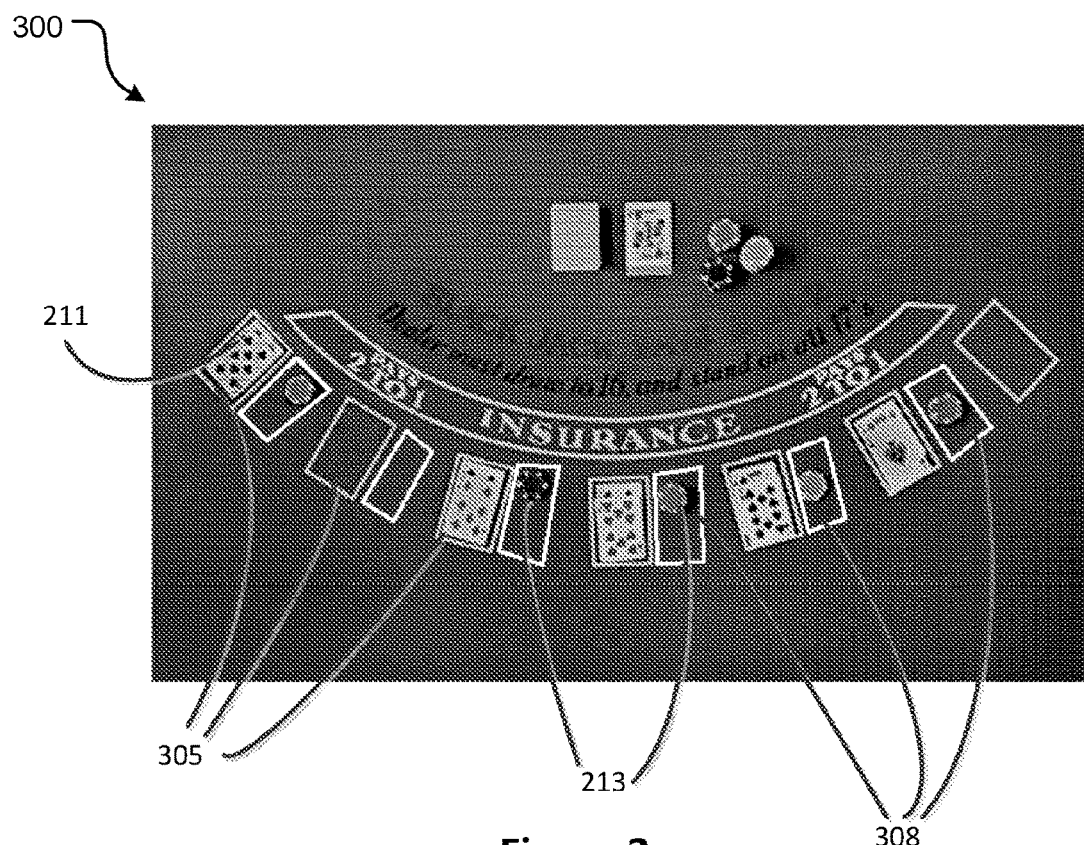
FIG. 3 is an image of a surface of a Gaming Table that may form part of a Gaming Environment of the system of FIG. 1.

FIG. 3 is an image 300 that illustrates part of the playing surface of a gaming table configured for the game of Blackjack. The playing surface or gaming table comprises a plurality of pre-defined regions of interest and, depending on the nature of the game, may have a specific orientation and function with respect to the operation of the game. A pre-defined region of interest may be designated for detection of specific game objects such as game cards or wager objects. For example, in FIG. 3, first pre-defined regions of interest 305 are designated to locate cards 211 dealt to a player and second pre-defined regions of interest 308 are designated to locate the chips or wager objects 213 a player may wager in a game. In some embodiments, one or more of a pre-defined region of interest may overlap with one or more of another pre-defined region of interest. In some embodiments, one pre-defined region of interest may form a part of another pre-defined region of interest.

Participants of the game include players who may place bets and dealers who conduct the game. To place bets or conduct the game, objects described as Game Objects are used by the players or dealers. Game Objects may comprise cards 211 in a specific shape with specific markings to identify them, Chips or wager objects 213 or other such objects may designate amounts players may wager in a game, or may comprise other objects with a distinct shape that may designate the outcome of a game such as a position marker or a dolly used in a game of roulette. The game is conducted through a series of Gaming Events that comprises the start of a game, placing of bets by players during a game, intermediate outcomes during a game and the end of a game determining the final outcome of the game. During a game, a player may place bets by placing his wager objects (i.e. betting tokens or chips) in a region of interest designated for placing of bets. For example, in the game of blackjack as shown in FIG. 3, a player may place a bet during a game, by placing one or more wager objects, such as chips 213, in their designated region 308 for placing a bet. The chips or wager objects may be arranged in groups or stacks within a region of interest. Often a group or stack of wager objects will be comprise a common colour of wager objects.

Figure 5:
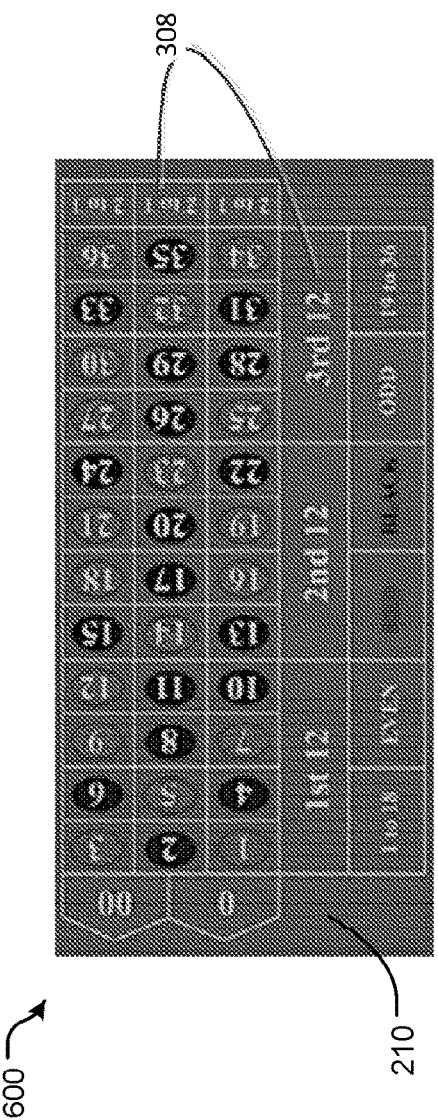
FIG. 5 is an image of a surface of another Gaming Table that may form part of the Gaming Environment of the system of FIG. 1.
Figure 6:
FIG. 6 is an image of a surface of another Gaming Table that may form part of the Gaming Environment of the system of FIG. 1.
Figure 4:
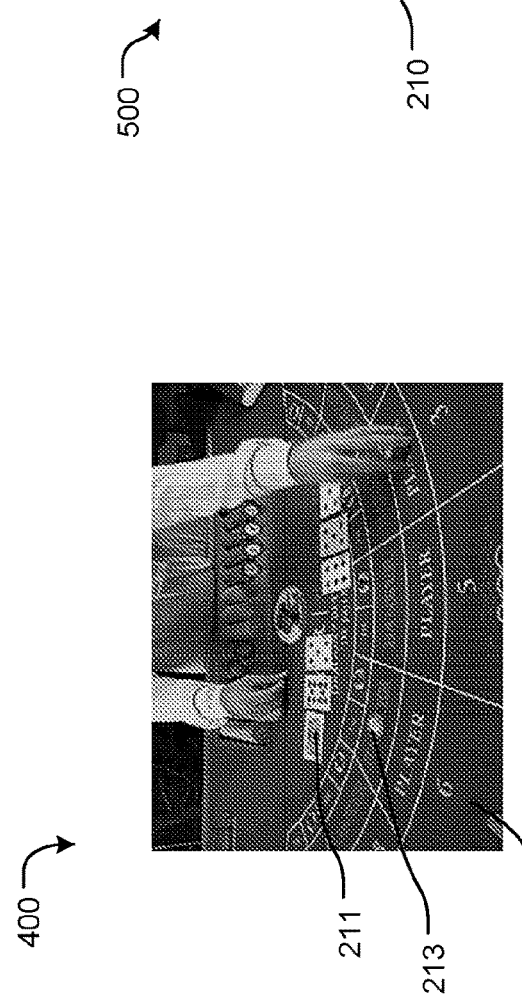
FIG. 4 is an image of a surface of another Gaming Table that may form part of the Gaming Environment of the system of FIG. 1.
Figure 7:
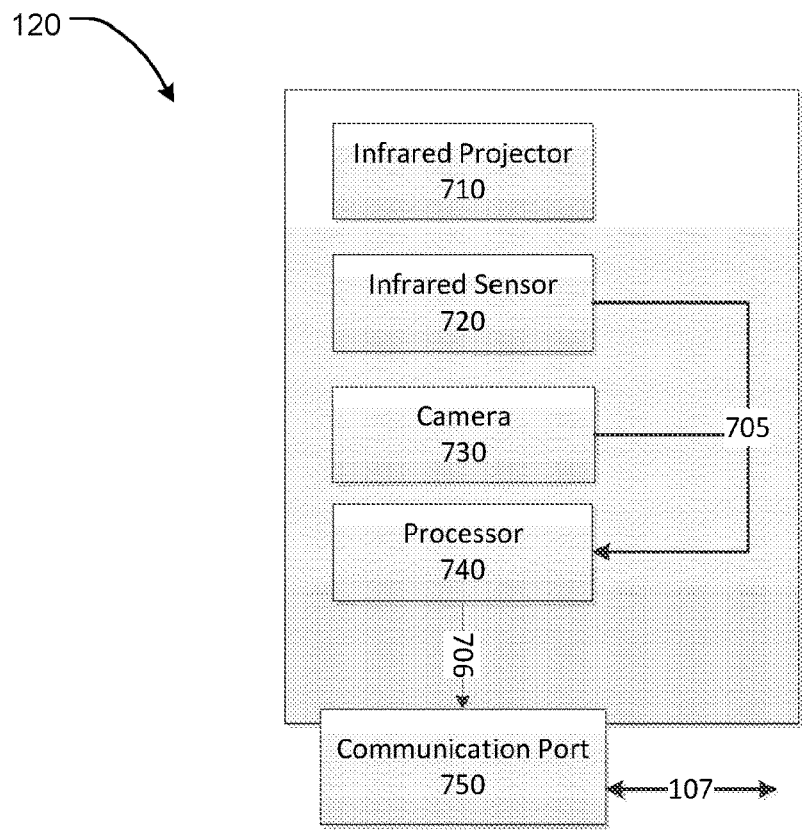
FIG. 7 is a block diagram of a Depth Sensing Device and Camera for use in the system of FIG. 1.

In certain games, a player may choose a region of interest that is associated with the likelihood of success and payoffs associated with a bet placed. For example, the playing surface 210 of FIG. 6 is a playing surface with marking for a betting area for a game of roulette. Different regions of interest 308 on the playing surface 600 may have different prospects of success and payoffs for a player's bet. Playing surfaces may have several different configurations in terms of location and structure of various regions of interests, depending on different rules and/or betting conventions associated with the game. FIG. 4 is an image 400 of a gaming table designed for a game of Baccarat. FIG. 5 is an image 500 of a gaming table designed for another game according to some embodiments.

Depth Sensing Device and Camera:

The Depth Sensing Device and Camera 120 performs the functions of capturing visual images and depth information of the field of view before the device. The device 120 is placed before a playing surface or a gaming table in order to capture all the designated regions of interest identified on the gaming table. The device 120 comprises an infrared projector 710, an infrared sensor 720, a camera 730, a processor 740, a communication port 750 and internal data links 705 that connect the infrared sensor 720 and camera 730 with the processor 740. Internal data link 706 connects the processor 740 with the communication port 750. The Depth Sensing Device and Camera 120, may capture images from multiple spectrums of human-visible and/or human-invisible light. For example, the Depth Sensing Device and Camera 120 may capture an image from the visible light spectrum through camera 730 and from the infrared spectrum through the infrared sensor 720, and consequently may operate as a multi-spectral camera.

The Depth Sensing Device and Camera 120 may rely on the Time of Flight technique to sense depth of the field of view or scene before it. The infrared projector 710 may project a pulsed or modulated light in a continuous wave that may be sinusoidal or a square wave. Multiple phases of projected light may be projected and sensed to improve accuracy of the depth information. The measured phrase shift between the light pulse emitted by the infrared projector 710 and the reflected pulse sensed by the infrared sensor 720 is relied upon by the processor 740 to calculate the depth of the field before the device. In some embodiments, the Depth Sensing Device and Camera 120 may include a structured-light 3D scanner relying on the principle of using a projected light pattern and a camera for depth sensing. In some embodiments, the Depth Sensing Device and Camera 120 may include a stereo camera that performs the function of depth sensing by using images from two or more lenses and corresponding image sensors. The Depth Sensing Device and Camera 120 may rely on other alternative means of depth or range sensing or a combination of two or more techniques to acquire depth information of the Gaming Environment and of the table playing surface 210 in particular.

Figure 8:
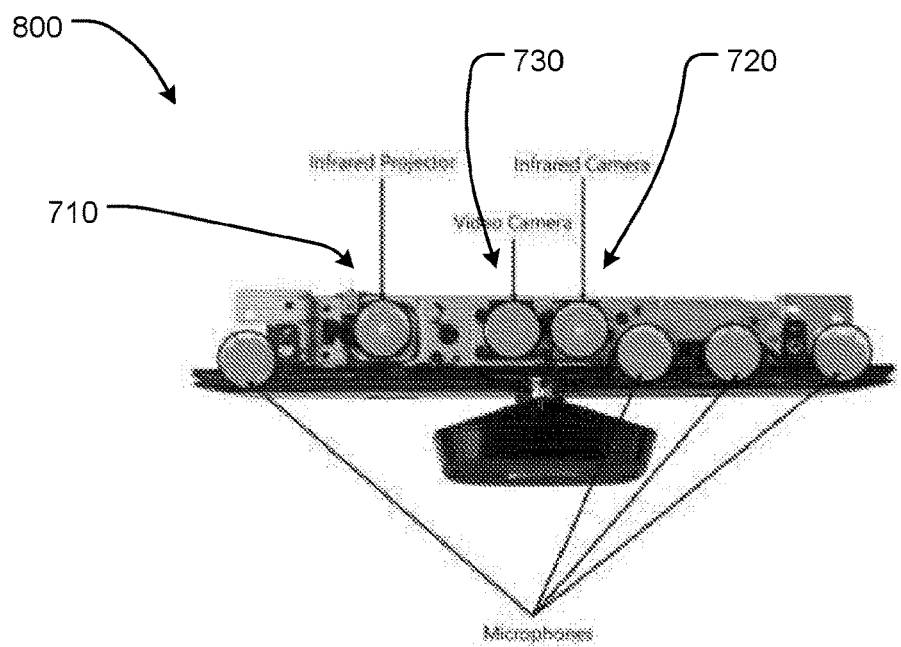
FIG. 8 is a front view of the inside of a housing of a Depth Sensing Device and Camera according to some embodiments.
Figure 9:
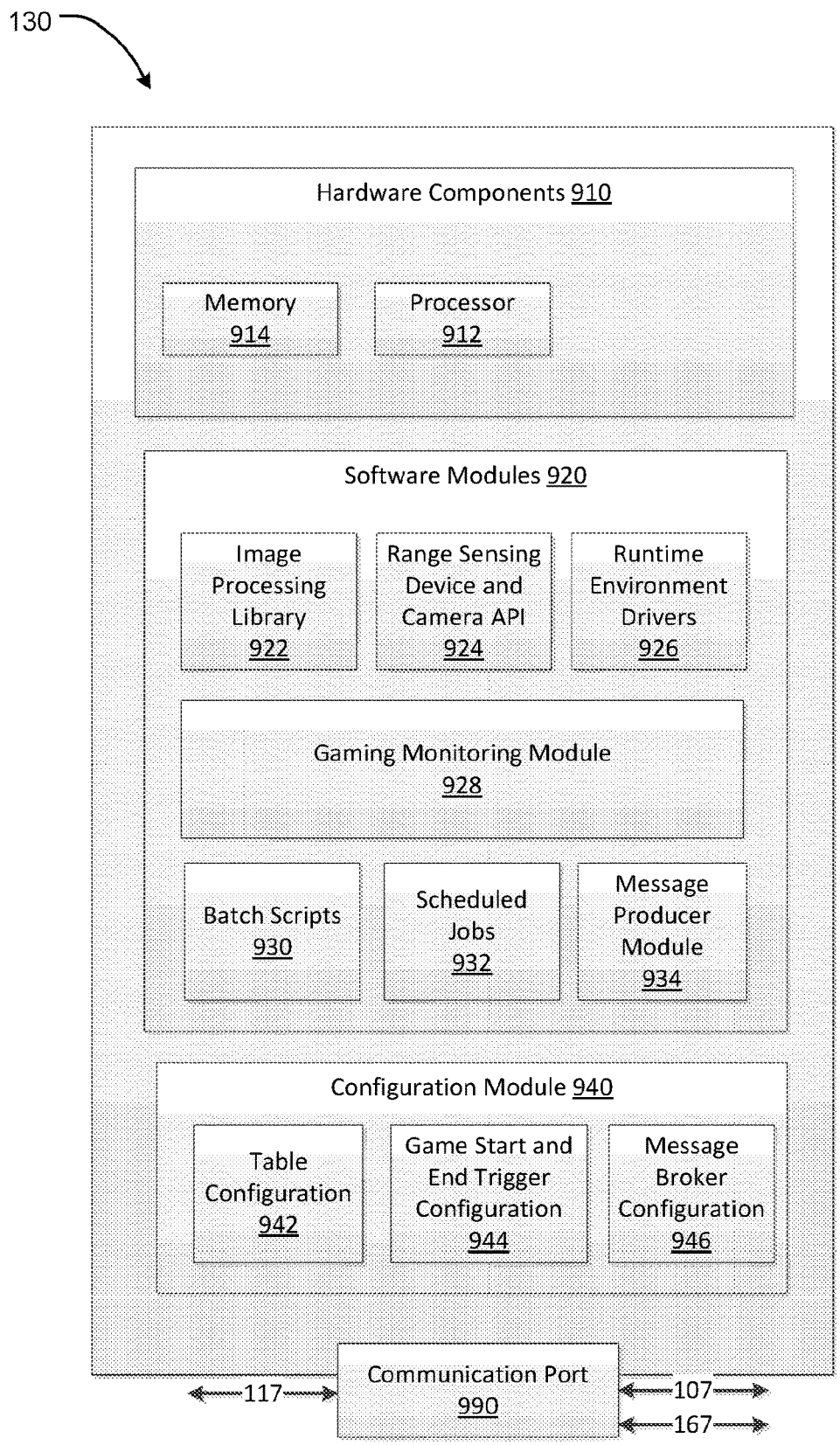
FIG. 9 is a block diagram of a Computing Device of the system of FIG. 1.
Figure 10:
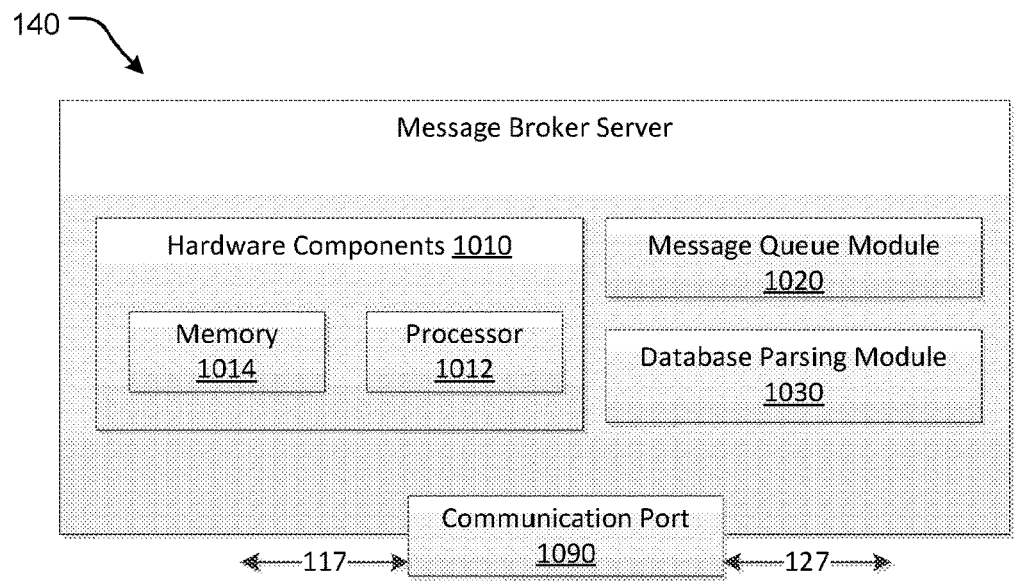
FIG. 10 is a block diagram of a Message Broker Server of the system of FIG. 1.
Figure 11:
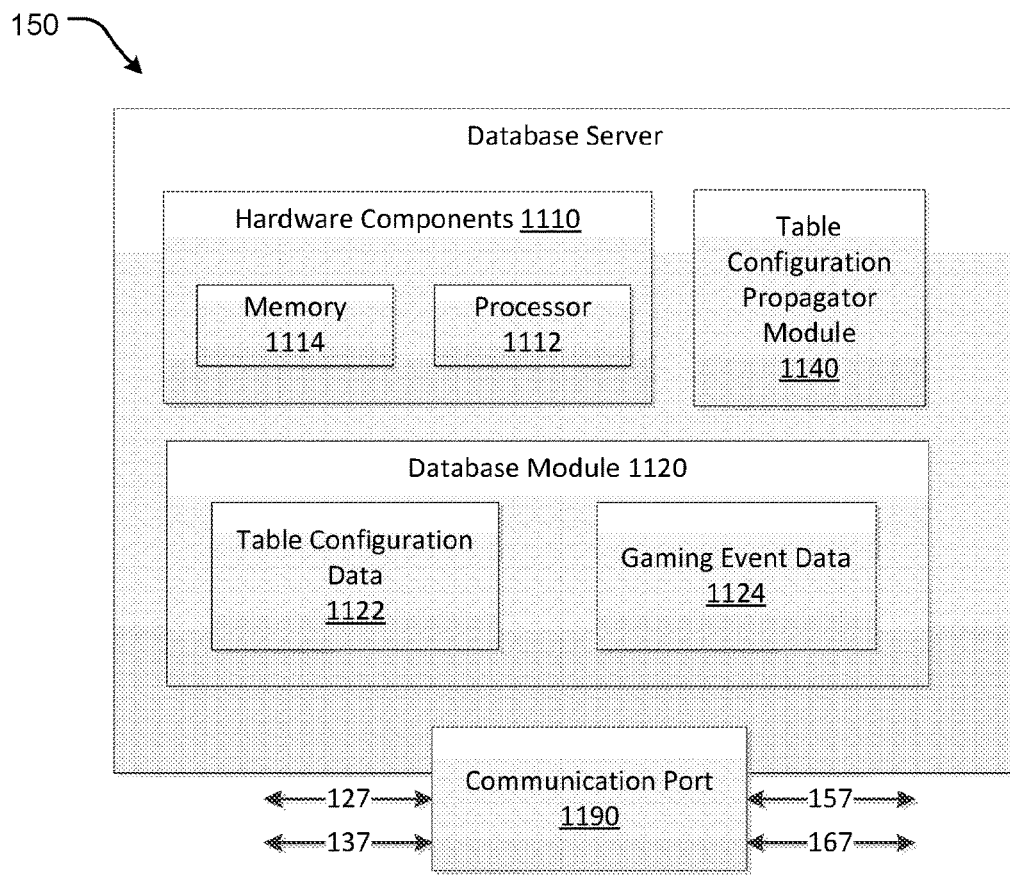
FIG. 11 is a block diagram of a Database Server of the system of FIG. 1.
Figure 12:
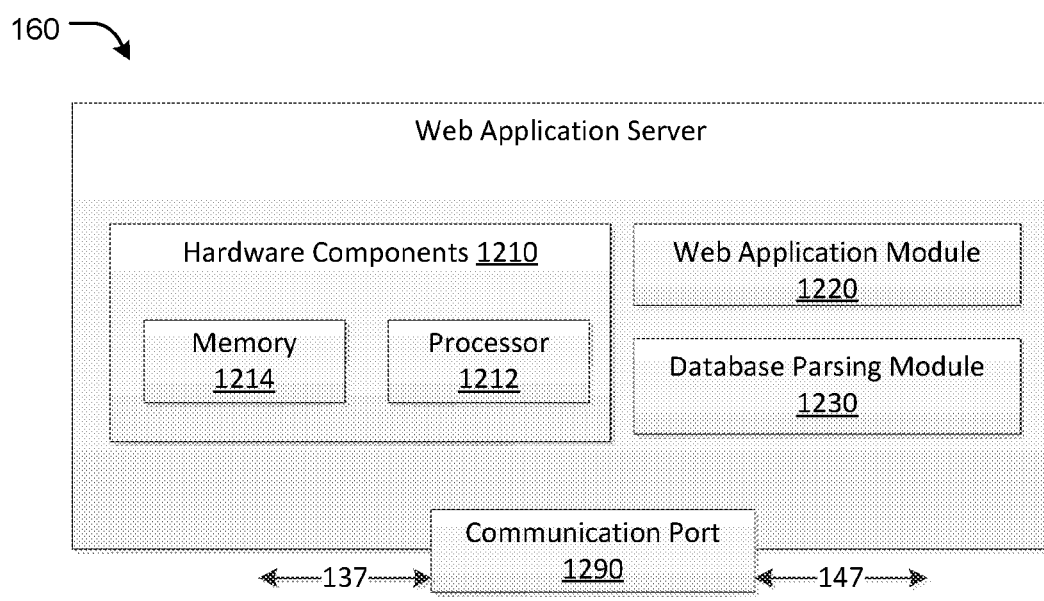
FIG. 12 is a block diagram of a Web Application Server of the system of FIG. 1.

The sensed depth information is combined with pixel grid information determined by the processor and presented as an output to the communication port 750. The pixel grid information is also combined with the visual images captured by the camera 730 and presented as output through the port 750 in combination with the depth information. Apart from the depth information, the infrared sensor 720 also senses the intensity of the infrared light reflected by the field of view and this information is combined with the pixel grid information by the processor 740 and passed to the port 750. The port 750 may be in the form of a physical port such as a USB port, for example or a wireless transmitter such as a wireless network adapter. The Depth Sensing Device and Camera 120 returns the sensed depth, colour and infrared imaging data in different coordinate spaces that may be mapped with each other to get a unified depth, colour and infrared data associated with a specific region or point in the field of view of the device. FIG. 8 is a front view of the inside of a housing of a Depth Sensing Device and Camera according to one embodiment 800 and illustrates some of its components including the Infrared Projector 710, Infrared Sensor 720, and Camera 730.

Computing Device:

The data generated by the Depth Sensing Device and Camera 120 is received by the Computing Device 130 through the communication port 990. The port 990 may be in the form of a USB port or a wireless adapter that couples with the communication port 750 to receive sensor data or transmit instructions to the Depth Sensing Device and Camera 120. Hardware Components 910 of the computing device 130 comprise Memory 914, Processor 912 and other components necessary for operation of the computing device. Memory 914 stores the necessary Software Modules 920 which comprise: an Image Processing Library 922; Depth Sensing Device and Camera API 924; Runtime Environment Driver 926; Gaming Monitoring Module 928; Batch Scripts 930; Scheduled Jobs 932; and a Message Producer Module 934.

The Image Processing Library 922 is a set of programs to perform basic image processing operations, such as performing thresholding operations, morphological operations on images and other programs necessary for the image processing steps undertaken by Gaming Monitoring Module 928. OpenCV is an example of an Image Processing Library that may be employed. The Depth Sensing Device and Camera API 924 is a set of programs that enables the Computing Device 930 to establish a communication channel with one or more Depth Sensing Device and Camera 920. For example, if a Microsoft™ Kinect™ device is employed as a Depth Sensing Device and Camera, then a Kinect for Windows™ SDK will be employed as the Depth Sensing Device and Camera API 924. This API 924 enables the Computing Device 130 to make queries to the Depth Sensing Device and Camera 120 in an appropriate protocol and to understand the format of the returned results. This API 924 enables the data generated by the Depth Sensing Device and Camera 120 to be received and processed by the Gaming Monitoring Module 928. The computing device 130 also has the Necessary Runtime Environment Drivers 926 to provide the necessary dependencies for the execution of the Gaming Monitoring Module 928. The Gaming Monitoring Module 928 comprises the programs that monitor gaming events occurring in the course of a game.

The Software Modules 920, also comprises Batch Scripts that may be in the form of windows power shell scripts or a script in other scripting languages to perform the necessary housekeeping and maintenance operations for the Gaming Monitoring Module 928. The batch scripts 930 may be executed on a scheduled basis through the Scheduled Jobs 932 that may be in the form of windows scheduler jobs or other similar job scheduling services. The Message Producer Module 934 based on instructions from the Gaming Monitoring Module 928 produces messages that are passed on to the Message Broker Server 140. The Message Producer Module may be based on a standard messaging system, such as RabbitMQ or Kafka, for example. Based on stored Message Broker Configuration 942 in the Configuration Module 940, the Message Producer Module 934 may communicate messages to the Message Broker Server 140 through the Communication Port 990 and the network link 117. The Configuration Module 940 also comprises Table Configuration 942 and Game Start and End Trigger Configuration 944. The components of the Configuration Module 940 are stored in the form of one or more configuration files in the Memory 914. The configuration files may be stored in an XML format, for example.

Message Broker Server:

The Message Broker Server 140 implements a message brokering service and listens for messages from a plurality of Computing Devices 130 through the network link 117. The Message Broker Server 140 may be located on the same premises as the Computing Device 130 within a common local network or it may be located off-premises (remotely) but still in communication via the network link 117 established between the two premises to enable the transfer of messages and data. The Message Broker Server 140 may be centralised and connected to Computing Devices 130 in a plurality of gaming venues to provide a centralised message brokering service. The Message Broker Server 140 has Hardware Components 1010 comprising Memory 1014, Processor 1012 and other necessary hardware components for the operation of the server. The Message Queue Module 1020 implements a queue to receive, interpret and process messages from a plurality of Configuration Devices 130. The messages are received through the Communication Port 1090 with may be in the form of a Network Adapter or other similar ports capable of enabling two way transfer of data and instructions to and from the Message Broker Server 140. The Message Queue Module 1020 may be implemented through a message broker package such as RabbitMQ or Kafka. The Message Queue Module 1020 on receiving a message comprising transaction information regarding gaming events occurring on a gaming table initiates a Database Parsing Module 1030. The Database Parsing Module 1030 parses the message received by the Message Queue Module 1020 into a database query that is subsequently executed on the Database Server 150 through the Network Link 127.

Database Server:

The Database Server 150 serves the purpose of receiving gaming event data from the Message Broker Server 140, storing table configuration data that is managed through the Web Application Server 160 and serving as a repository for Database Client 180 to provide access to the gaming event data captured by the Gaming Monitoring System 100. The Database Server 150 has Hardware Components 1110 comprising Memory 1114, Processor 1112 and other necessary hardware components for the operation of the server. A Communication Port 1190 may be in the form of a Network Adapter or other similar ports capable of enabling two way transfer of data and instructions to and from the Database Server 150 through one or more network links Database Module 1120 may be implemented through a database management system such as MySQL™, Postgres or Microsoft™ SQL Server.

The Database Module 1120 holds data comprising Table Configuration Data 1122 and Gaming Event Data 1124. Gaming Event Data 1124 comprises transaction data representing Gaming Events that occur on a gaming table or a playing surface. The records forming Gaming Event Data may comprise a timestamp for the time a gaming event was recognised; a unique identifier for the gaming table on which the gamin event occurred; an identifier for the nature of the gaming events such as placing of a bet, intermediate outcome if a game, final outcome of a game; an identifier of a region of interest associated with the gaming event; an estimate of a bet value associated with a region of interest; and other relevant attributes representing a gaming event.

The Table Configuration Data 1122 comprises: unique identifiers for gaming tables and associated Computing Device 130; location of regions of interest 308 on the gaming table in the form of polygons and coordinates of pixels associated with the Depth Sensing Device and Camera 120 forming the endpoints of the polygons; the nature of the region of interest 308, whether it is a region for placing cards or for placing chips or for placing a specific gaming object to be detected; nature of game start and end triggering events, whether the start of a game is detected by placing of cards on the region of interest or the placing of a specific gaming object on a specific region of interest; model contours for game objects such as cards or chips, for example to enable detection by the Gaming Monitoring Module 928; and other relevant data necessary to represent the parameters relied on by the Gaming Monitoring System 100. In some embodiments, the Table Configuration Data 1122 and Gaming Event Data 1124 may be held in separate database servers to enable greater scalability and manageability of the Gaming Monitoring System 100.

The Database Server 150 also comprises a Table Configuration Propagator Module 1140 which performs the function of propagating Table Configuration Data 1122 to the respective Computing Device 130. The Table Configuration Propagator Module may be implemented through a combination of database scripts and command line scripts that first generate Table Configuration 942, Game Start and End Trigger Configuration 944 and Message Broker Configuration 946 in the form of a configuration file such as an XML file, for example. The generated configuration files may be transferred to the respective Computing Device 130 through the Communication Port 1190 replying on a Network Link 167. The Network Link 167 may be a local network link if the Database Server 150 and the Computing Device 130 are in the same local network or a network link spanning multiple computer networks if the Database Server 150 and the Computing Device 130 are located in separate networks. The transfer of the configuration files may be effected through an appropriate network protocol such as File Transfer Protocol or SSH File Transfer Protocol, for example.

Web Application Server:

A Web Application Server 160 hosts a Web Application that facilitates the configuration and management of the Table Configuration Data 1122 on the Database Server 150. The Web Application Server 160 has Hardware Components 1210 comprising Memory 1214, Processor 1212 and other necessary hardware components for the operation of the server. A Communication Port 1290 may be in the form of a Network Adapter or other similar ports capable of enabling two way transfer of data and instructions to and from the Web Application Server 160 through one or more network links. The Web Application Server comprises a Web Application Module 1220 which comprises web interfaces that enable a user to create and update Table Configuration Data 1122 on the Database Server 150. The web application may be implemented through a web application framework such as Django in python or ASP.NET or other similar web frameworks, for example. The Web Application Server 160 also comprises a Database Parsing Module 1230 that translates instructions received by the Web Application Module 1220 through the web interface into specific database queries or commands that will create or update The Table Configuration Data 1122 to reflect the operations undertaken by an Administrator Client 170. The database queries or commands are executed on the Database Server 150 through a Network Link 137. The Network Link 137 may be a local area network link if the Database Server 150 and the Web Application Server 150 are in a common network or it may span multiple networks if the Database Server 150 and the Web Application Server 150 are located in separate networks.

Figure 13:
FIG. 13 is a screen shot of a Web Application showing an interface for managing the configuration of another Gaming Table that may form part of a Gaming Environment of the system of FIG. 1.

Web Interface:

FIG. 13 is a screen shot 1300 of a Web Application showing an interface for managing the configuration of an embodiment of the Gaming Table that may form part of a Gaming Environment 110. Parameters that may be required in setting up a gaming table and the parameters may include a unique identifier for a table, an IP address of an associated computing device, for example are located in the screen region 1310. Part on an XML configuration file that may be propagated to the Computing Device 130 to codify the Table Configuration 942 is shown in the screen area 1320. A button 1330 may be used to create records for additional gaming tables and a submit button 1340 enables a user to submit a new configuration.

Figure 14:
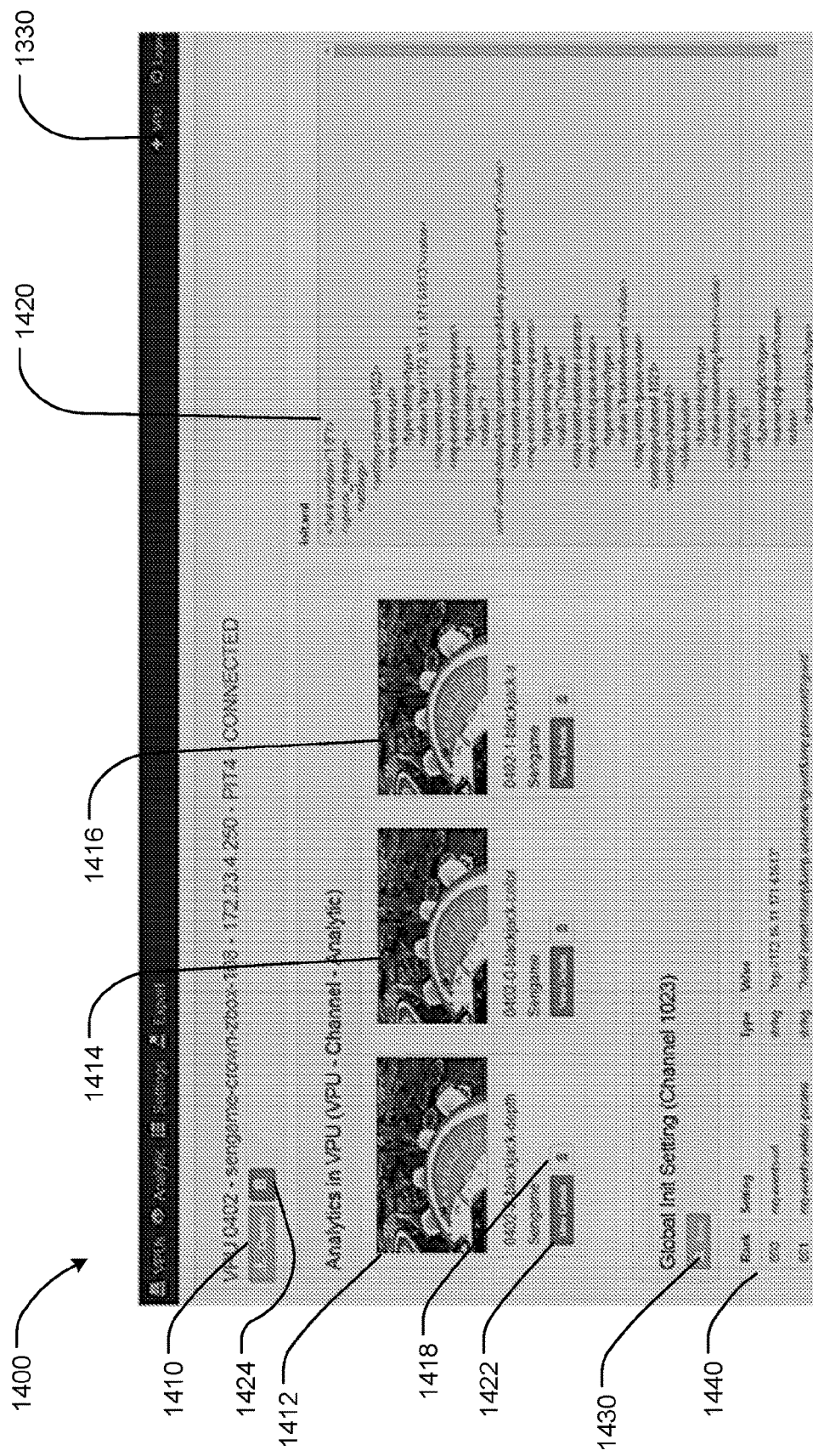
FIG. 14 is another screen shot of the Web Application showing an interface for managing the configuration of another Gaming Table that may form part of a Gaming Environment of the system of FIG. 1.

FIG. 14 is another screen shot 1400 of the Web Application showing another interface for managing the configuration of an embodiment of the Gaming Table that may form part of a Gaming Environment 110. A deploy button 1410 may be clicked to deploy a set of saved configurations to the Computing Device 130 through the network link 167. The delete button 1424 may be clicked to delete any saved configurations. 1420 is a sample of part of another XML file that may be used to store and propagate configuration information to Computing Device 130. Screen regions 1412, 1414 and 1416 represent depth, colour and infrared image streams from the Depth Sensing Device and Camera 130. Details of configurations associated with individual streams may be view by clicking the button 1422. The configuration details may be deleted by clicking on the button 1418. The screen region 1440 allows a user to set up default configurations for all tables that may be saved by clicking the save button 1430.

The button 1430 may be used to save changes to gaming table configurations before deployment.

Figure 15:
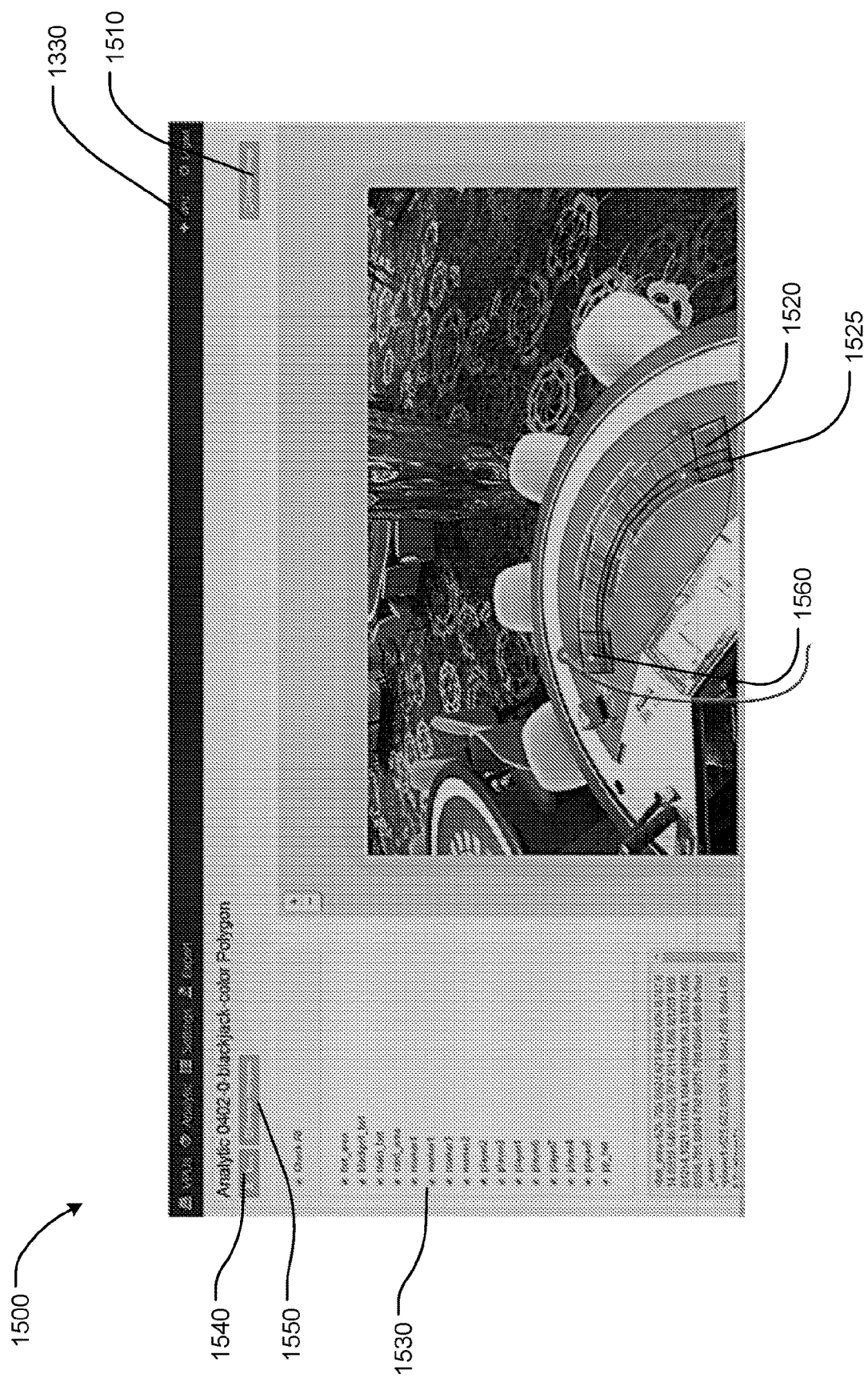
FIG. 15 is another screen shot of the Web Application showing an interface for managing the configuration of another Gaming Table that may form part of a Gaming Environment of the system of FIG. 1.

FIG. 15 is another screen shot 1500 of the Web Application showing another interface for managing the configuration of an embodiment of the Gaming Table that may form part of a Gaming Environment 110. The interface shown in screenshot 1500 allows the types, positions and boundaries of the regions of interest to be defined using user interface tools. Such defined regions of interest then become "pre-defined regions of interest" as referred to herein once they are saved into the game configuration data. The button 1510 may be clicked to get a refreshed image of a gaming table if the position of the gaming table with respect to the Depth Sensing Device and Camera 120 changes. The image frame 1515 shown in screenshot 1500 includes one or more bounded regions of interest 1520, with each bounded region of interest defined by a polygon 1525. Custom polygons may be drawn using selectable handles 1560 and added to a list of polygons 1530, for example. Save button 1540 enables a user to save changes made to polygons and a remapping button 1550 enables a user to remap existing polygons to different locations.

To develop a system for automated recognition of gaming, it is necessary to understand the behaviour of gaming We deal with two kind of gaming tables. One is a card-based game or card game which is any game using playing cards as the primary device with which the game is played, be they traditional or game-specific. Examples of this type are blackjack, baccarat, and poker. The other type of table game is not based on cards, for example roulette. In this game, players may choose to place bets on either a single number or a Depth of numbers, the colours red or black, or whether the number is odd or even. To determine the winning number and colour, a croupier spins a wheel in one direction, then spins a ball in the opposite direction around a tilted circular track running around the circumference of the wheel.

The behaviour of card-based games is as follows.

Players are free to place bets for some time.

Dealer says 'no more bets' and starts dealing cards to players. This is when the game starts.

After the game results have been finalized, the dealer collects losing players' chips and gives out winning chips.

Then dealer clear out all the cards. This is when the game ends.

Behaviour of non-card based games, especially roulette.

Players are to place bets for some time.

Dealer spins the wheel and waits for some time until the ball is close to stopping, then announces 'no more bets'. This is when the game starts.

After the ball has stopped, the dealer puts a dolly on the table on the wining number. Winning/losing chips are allocated/gathered by the dealer.

After that, the game ends.

Overall Monitoring Process:

The Gaming Monitoring System 100 in its operation underpins two fundamental aspects: Contour Detection; and Plane Estimation. Contour Detection comprises a set or processes or techniques that may be performed in real-time or near real-time, to recognise shapes in images captured by the Depth Sensing Device and Camera 120. Near real-time processing may comprise processing with a latency of a few seconds, for example 2-3 seconds or less after the occurrence of an event. Plane Estimation comprises a set of processes or techniques that may be performed in real-time or near real-time, to estimate the position of a plane representing a gaming table or a playing surface based on the depth data and images captured by the Depth Sensing Device and Camera 120. Once the step of Plane Estimation is performed, the obtained plane position information may be combined with additional depth data captured by the Depth Sensing Device and Camera 120 to estimate the height of a stack of game objects on a gaming table and make an inference about the value associated with a stack of game objects such as a stack of chips, for example.

Image Pre-Processing Steps:

Before the Contour Detection or Plane Estimation techniques may be applied, a number of Image Pre-processing Steps are applied to the images captured by the Depth Sensing Device and Camera 120. These Image Pre-processing Steps improve the performance and accuracy of processes implementing the Contour Detection and Plane Estimation techniques.

Thresholding:

One image pre-processing technique that may be employed is Thresholding. The Depth Sensing Device and Camera 120 returns data in colour and infrared image frames of the Gaming Environment 110. Thresholding techniques may be applied to both streams of colour and infrared data. Each pixel in a particular frame of either colour or infrared stream is represented by a numeric value that indicates the colour or intensity of the pixel. A colour image frame may be converted into a greyscale image frame before performing a thresholding operation. Global thresholding is one method of implementing thresholding. In Global thresholding each pixel value is compared with an arbitrary threshold value; if the pixel value is greater than the threshold it is assigned a value corresponding to white, for example, 255 in an 8 bit scale; else it is assigned a value corresponding to black, for example, 0 in an 8 bit scale. Through a series of images 1600, FIG. 16 illustrates an example of the results of thresholding on a sample image 1601. Image 1602 is the result of the application of Global Thresholding to the Image 1601 using the value of 127, the Image 1601 being represented in an 8 bit format. Global thresholding may not be sufficient for a variety of real world applications. An image may have different lighting conditions in various parts of the image and application of the Global Thresholding technique may diminish the parts of an image with low lighting conditions.

Adaptive Thresholding is an alternative to address the limitations of Global Thresholding. In Adaptive Thresholding, threshold values for different, small regions of an image are found and applied to the regions for the purposes of thresholding. The threshold values for adaptive thresholding may be calculated by taking the mean values of the pixels in a neighbourhood of a pixel, or a weighted sum of neighbourhood pixels where the weights may be taken from a Gaussian distribution. In FIG. 16, image 1603 is an example of the output of application of the Adaptive Means Thresholding technique and image 1604 is an example of the output of the application of Adaptive Gaussian Thresholding technique to the original image 1601. Another alternative method of thresholding is Otsu's Binarization. In this method the thresholding is performed based on image histograms. Through a series of images 1700, FIG. 17 illustrates an example of the application of Otsu's Binarization technique on a set of sample images 1701 with representative histograms 1702. One or more of the alternative thresholding techniques may be applied at a pre-processing stage and to the colour or infrared image frames. The Image Processing Library 922 may provide reusable libraries that implement the proposed thresholding techniques that can be invoked by the Gaming Monitoring Module 928 in the image pre-processing stage.

Morphological Transformations:

Morphological transformations are operations based on the image shape. It is normally performed on binary images. It needs two inputs, one is our original image, second one is called structuring element or kernel which decides the nature of operation. Two basic morphological operators are Erosion and Dilation Morphological Transformations are performed on the images captured by the Depth Sensing Device and Camera 120 in order to enhance the features to be detected in the images and improve the performance and accuracy of Contour detection processes. Erosion and Dilation are examples of morphological transformations that may be applied during the image pre-processing stage. Both the erosion and dilation processes require two inputs, image data in the form of a matrix captured by the Depth Sensing Device and Camera 120 and a structuring element, or kernel which determines the nature of the morphological operation performed on the input image. The Kernel may be in the shape of a square or a circle and has a defined centre and is applied as an operation by traversing through the input image.

Erosion:

A morphological transformation of erosion comprises a sharpening of foreground objects in an image by using a kernel that as it traverses through an image, the value of a pixel is left to a value of 1 or a value corresponding to the white colour only if all the values in corresponding to the kernel are 1 or a value corresponding to the white colour. Kernels of size 3×3 or 5×5 or other sizes may be employed for the operation of erosion. Erosion operation, erodes away the boundary of foreground objects. Through a series of images 1800, FIG. 18 illustrates an example of the application of erosion and dilation operators. An example of the effect of the erosion operation on an input image 1801 may be seen in erosion output image 1802. The operation of erosion may be performed by a predefined library in the Image Processing Library 922. For example, if the OpenCV library is used, the function "erode" may be invoked by the Gaming Monitoring Module 928 to operate on an image captured by the Depth Sensing Device and Camera 120.

To achieve Erosion the kernel slides through the image (as in 2D convolution). A pixel in the original image (either 1 or 0) will be considered 1 only if all the pixels under the kernel is 1, otherwise it is eroded (made to zero).

Dilation:

An operation of dilation is the inverse of erosion. For example, in a dilation operation using a 3×3 square matrix kernel, the pixel at the centre of the kernel may be left to a value of 1 or a value corresponding to the white colour in any one of the values in the corresponding kernel is 1 or a value corresponding to the white colour. An example of the effect of this operation on an input image 1802 may be seen in the erosion output image 1803. As a consequence of dilation, the features in an image become more continuous and larger. The operation of dilation may be performed by a predefined library in the Image Processing Library 922. For example, if the OpenCV library is used, the function "dilate" may be invoked by the Gaming Monitoring Module 928 to operate on an image captured by the Depth Sensing Device and Camera 120.

Dilation is just the opposite of erosion. Here, a pixel element is 1 if at least one pixel under the kernel is 1. So it increases the white region in the image or size of foreground object increases. Normally, in cases like noise removal, erosion is followed by dilation. Because, erosion removes white noises, but it also shrinks our object. So we dilate it. Since noise elements are removed by erosion they are not reintroduced by dilation, but the object area increases. It is also useful in joining broken parts of an object.

The application of a thresholding technique to an image produces a binary image. To further enhance features present in an image, the morphological transformations of erosion and dilation are applied. Advantageously, the morphological transformations assist in reduction of noise from images, isolation of individual elements and joining disparate elements in an image.

An image contour comprises a curve joining all continuous points along the boundary of an object represented in an image. Contours are a useful tool for shape analysis and object detection and recognition. Contour Approximation is used to approximate the similarity of a certain shape to that of the desired shape in the application. The desired shape may be in the form of a polygon or a circle or an ellipse, for example. For better accuracy and performance, contour detection operations may be performed on binary images after Edge Detection operation has been performed.

Edge Detection:

Edge detection is an image processing technique for finding the boundaries of objects within images. It works by detecting discontinuities in brightness. Among those, Canny is a popular multi-stage edge detection algorithm (or process) which can be described as following steps.

Figure 19:
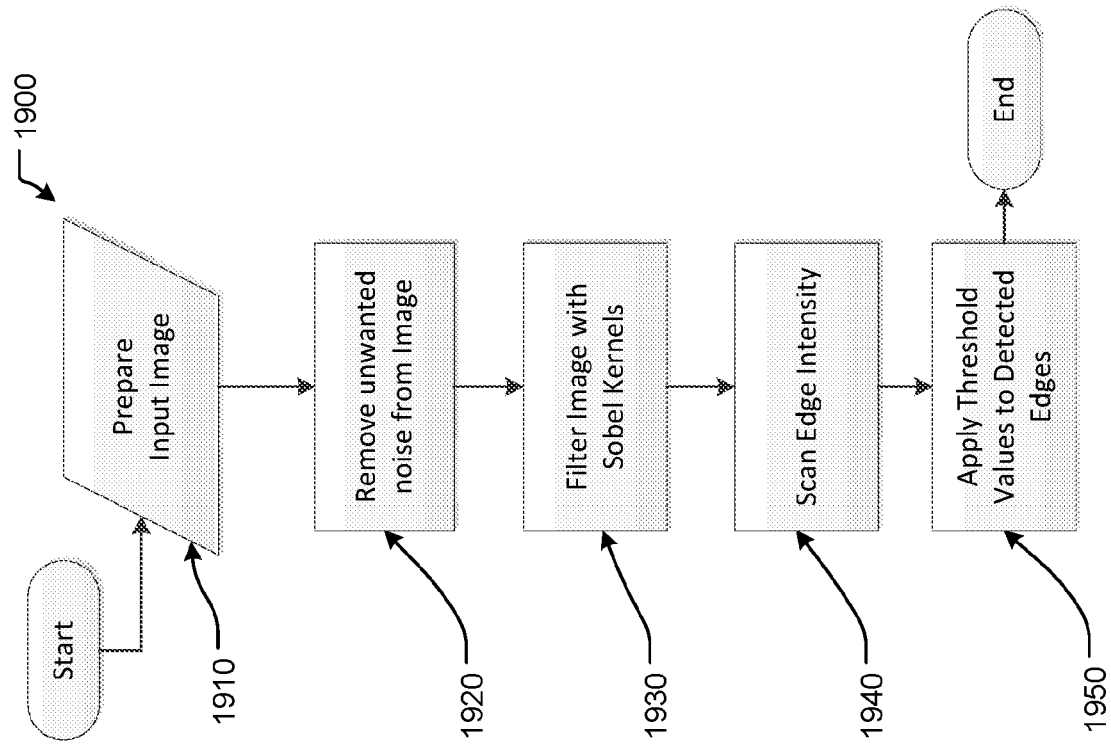
FIG. 19 is a flowchart of an edge detection process.

Edge detection may be performed by detecting brightness discontinuities between neighbouring pixels and pixel clusters. Several image processing techniques may be employed to perform this operation. Some embodiments implement the Canny Edge detection operator or process to detect edges in images captured by the Depth Sensing Device and Camera 120. FIG. 19 is a flowchart 1900, that represents a series of steps that are involved in the implementation of the Canny Edge detection operator. The step 1910 involves the preparation of an image for use as an input to the operator. This step may comprise application of an appropriate thresholding technique to the image, and application of erosion or dilation to improve the performance of rest of the edge detection process. The step 1920 comprises reduction of unwanted noise from the image. This may be achieved with the application of a 5×5 Gaussian filtering kernel, for example. This step smoothens the features in the image and improves the performance of rest of the process. An example of a Gaussian filtering kernel that may be employed is as follows:

$$\begin{bmatrix} 2 & 4 & 5 & 4 & 2 \\ 4 & 9 & 12 & 9 & 4 \\ 5 & 12 & 15 & 12 & 5 \\ 4 & 9 & 12 & 9 & 4 \\ 2 & 4 & 5 & 4 & 2 \end{bmatrix}$$

The step 1930 comprises estimation of the intensity gradient of the image. To perform this operation, the input image is filtered by two Sobel kernels. Operation of the kernel $G_x$ returns a first derivative of the image in the horizontal direction and kernel $G_y$ returns a first derivative of the input image in the vertical direction. The kernels $G_x$ and $G_y$ that may be used are:

$$Gx = \begin{bmatrix} -1 & 0 & 1 \\ -2 & 0 & 2 \\ -1 & 0 & 1 \end{bmatrix}$$

$$Gy = \begin{bmatrix} -1 & -2 & -1 \\ 0 & 0 & 0 \\ 1 & 2 & 1 \end{bmatrix}$$

Based on the first horizontal and vertical derivatives of the input image, the edge gradient G and the direction of each pixel 0 can be calculated as follows:

$$G = \sqrt{G_x^2 + G_y^2}$$

$$\theta = \tan^{-1}\left(\frac{G_x}{G_y}\right)$$

The gradient direction is generally perpendicular to the edges, and may be rounded to one of four angles which represent the vertical, horizontal and two diagonal directions.

Figure 20:
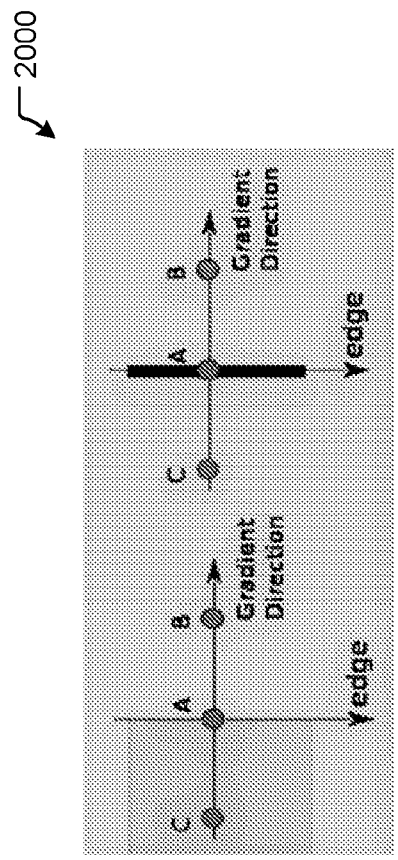
FIG. 20 is a diagram to illustrate edge detection in part of the process of FIG. 19.

In step 1940, a complete scan of the edge intensity image may be done to remove any unwanted pixels which may not constitute an edge or a desired edge. This is achieved by checking if each pixel is a local maximum in its neighbourhood in the direction of its gradient. As illustrated in graph 2000 of FIG. 20, Point A is on an edge in a vertical direction; a gradient direction is normal to the edge. Points B and C are located within the gradient direction, therefore point A may be compared against points B and C to observe if it forms a local maximum. If so, it is considered for the next stage 1950 in the process, otherwise it may be suppressed by being assigned to point A, a pixel value of 0. The result is a binary image with pixels of value 1 corresponding to thin edges and 0 to no edge.

Figure 21:
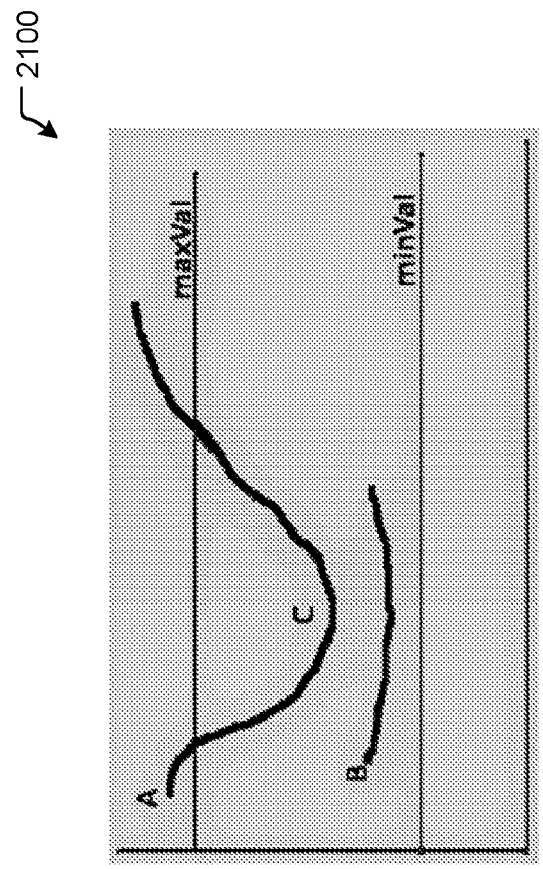
FIG. 21 is an example graph to illustrate example criteria applied in the edge detection process of FIG. 19.

In step 1950, it is estimated which of the edges detected in the previous step are true positives, meaning they are more likely represent an edge in the real world represented by the input image, rather than a false positive. In order to perform this operation, two threshold values may be defined: minVal and maxVal. Edges with an intensity gradient greater than maxVal are considered to be a sure-edge, and those below minVal may be considered as non-edges and discarded. The edges which lie within the two thresholds may be further classified as edges or non-edges by their connectivity property. If they are connected to sure-edge pixels, they are considered to form part of the edge. Otherwise, they may be discarded as false positives. For example in graph 2100 of FIG. 21, edge A is above maxVal, therefore it may be considered a true positive. Although edge C is below maxVal, it is connected to edge A, and therefore it may also be treated as a true positive edge, and the entire curve may be considered valid. Although edge B is above minVal and is in the same region as that of edge C, it is not connected to any true positive edges and therefore it may be treated as a false positive. Values for minVal and maxVal are chosen to achieve the optimal result. For example minVal may be set to a value of between 20-60 and maxVal may be set to a value between 60-180. This stage may also remove noise in the form of small pixel clusters.

Some or all of the steps identified in FIG. 19 may be performed through programs available in the Image Processing Library 922. For example, if the OpenCV library is used, the "canny" edge detection function call may be used. Other alternative methods of edge detection may also be utilized as an alternative to canny edge detection to get the same result of identification of edges in an input image.

Contour Detection:

After an edge detection operator has been applied to an input image to identify edges, contour detection processes may be applied to the result of the edge detection operation to approximate the similarity of shapes in an image to certain model shapes such as a polygon, or a circle for example.

Contours may be explained as a curve joining all the continuous points (along the boundary), having same colour or intensity. The contours are a useful tool for shape analysis and object detection and recognition. It is suggested that for better accuracy, binary images be used as an input to contour detection algorithms (or processes). So before finding contours, it is suggested that one should apply thresholding or canny edge detection. In our application we use border following algorithms (or processes) for the topological analysis of digitized binary images. These algorithms (or processes) determine the surroundness relations among the borders of a binary image. Since outer borders and hole borders have a one-to-one correspondence to the connected components of a pixels and to the holes, respectively, the algorithm (or process) yields a representation of a binary image, from which one may extract some features without reconstructing the image. The second border following algorithm (or process), which is a modified version of the first, follows only the outermost borders (i.e., the outer borders which are not surrounded by holes).

Contour Approximation is also performed, which approximates a contour shape to another shape (polygon) with a lesser number of vertices, depending upon the precision we specify. It may be implemented through the Douglas-Peucker algorithm as follows:

```
function DouglasPeucker ( PointList [ ], epsilon )
// Find the point with the maximum distance
dmax = 0
index = 0
end = length ( PointList )
for i = 2 to ( end − 1 ) {
    d = perpendicularDistance ( PointList [i],
    Line ( PointList [1] , PointList [end ]))
    if ( d > dmax ) {
    index = i
    dmax = d
    }
```

```
}
// If max distance is greater than epsilon,
// recursively simplify
if ( dmax > epsilon ) {
// Recursive call
recResults1 [ ] = DouglasPeucker ( PointList [1... index
],
epsilon )
recResults2 [ ] = DouglasPeucker ( PointList [ index ...
end],
epsilon )
// Build the result list
ResultList [ ] = { recResults1 [1... length ( recResults1
) -1],
recResults2 [1... length ( recResults2 )]}
} else {
ResultList [ ] = { PointList [1] , PointList [end ]}
}
// Return the result
return ResultList [ ]
end
```

Figure 22:
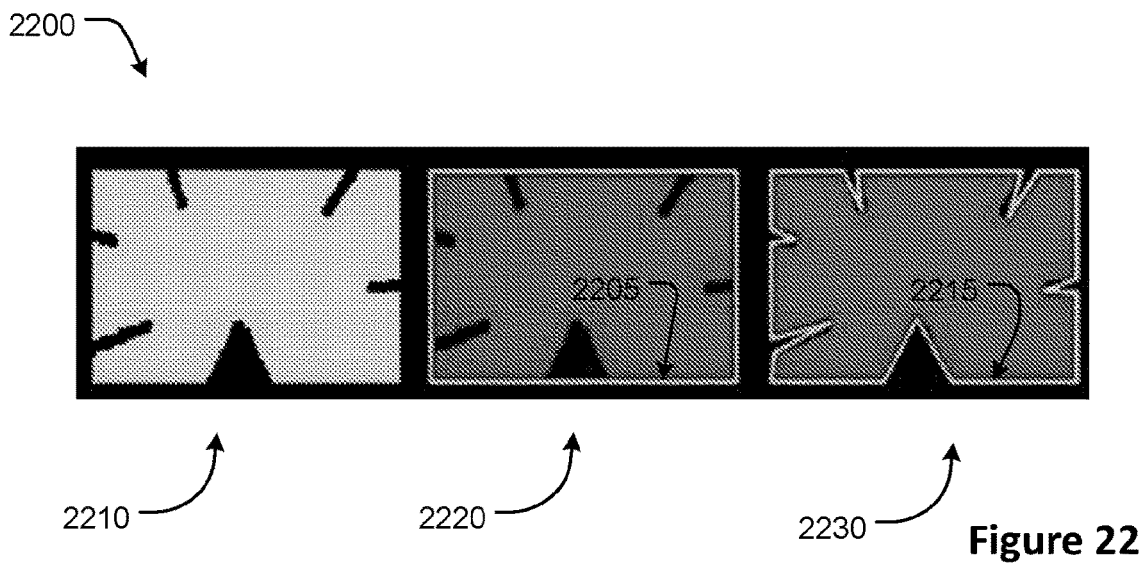
FIG. 22 is a set of images to illustrate application of a contour detection process on a sample image with different parameters.

In FIG. 22, a series of images 2200 represent various stages of the application of the Douglas-Peucker algorithm. Image 2210 is the original image that may be used as an input image. The line 2205 in image 2220, represents an approximated curve for the value of epsilon equal to 10% of arc length. The line 2215 in image 2230, represents an approximated curve for the value of epsilon equal to 1% of arc length.

Contour estimation operations may be performed using pre-packaged functions in the Image Processing Library 922 by invoking them in the Gaming Monitoring Module 928. For example if OpenCV is used for implementing the contour estimation process, then the functions "findContours" or "drawContours" or "approxPolyDP" may be invoked to implement the process, for example.

Plane Detection Process:

As a precursor to the estimation of the height of a stack of chips on the gaming table or the playing surface, the Gaming Monitoring System 100 estimates the position of a plane which comprises the gaming table or the playing surface. One method of estimating the equation of the plane is through Principal Component Analysis (PCA). PCA minimizes the perpendicular distances from a set of data to a fitted model. This is the linear case of what is known as Orthogonal Regression or Total Least Square. For example, given two data vectors, x and y, a line in the form of a linear equation with two variables can be estimated that minimizes the perpendicular distanced from each of the points $(x_i, y_i)$ to the line. More generally, an r-dimensional hyperplane can be fit in p-dimensional space, where r is less than p. The choice of r is equivalent to the choice of number of components to retain during PCA.

The basic mathematical model of a plane can be formulated as:

$$ax+by+cz+d=0$$

The values a, b, c, and d need to be estimated to minimize the distance from points selected on the gaming table or the playing surface. Based on a binary version of an image obtained during the chip detection stage, 100 or more points that are not detected as chips may be chosen as input points for PCA. Since these chosen points are points in a two dimensional space, the depth information associated with points is utilized to obtain co-ordinates in a two dimensional space. The principle of the Pinhole Camera Model is relied on to convert the points in the two dimensional space to points in the three dimensional space. Given a point in the two dimensional space with coordinates (x,y), depth value Z and $(C_x, C_y)$ as x, y coordinates of the optical centre of the Depth Sensing Device and Camera 120; the coordinates (X, Y, Z) of the same point in the three dimensional space can be determined using the following equations:

$$\frac{Y}{Z} = \frac{x - C_x}{f}$$

$$\frac{Y}{Z} = \frac{y - C_y}{f}$$

Figure 23A:
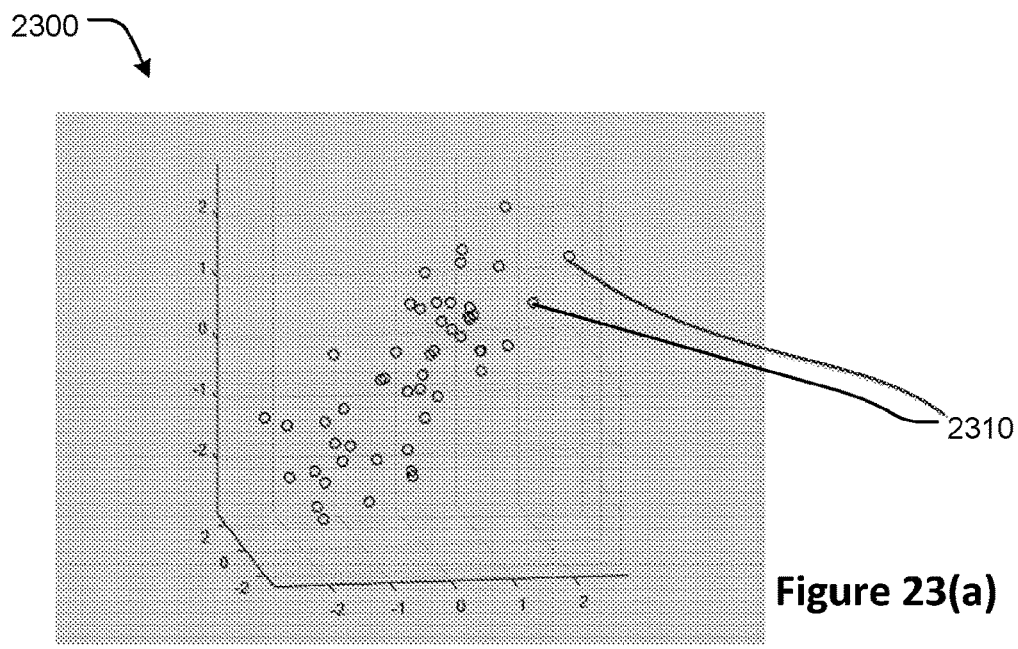
FIG. 23(a) is a plot of a set of points over which a plane estimation process is to be applied.
Figure 23B:
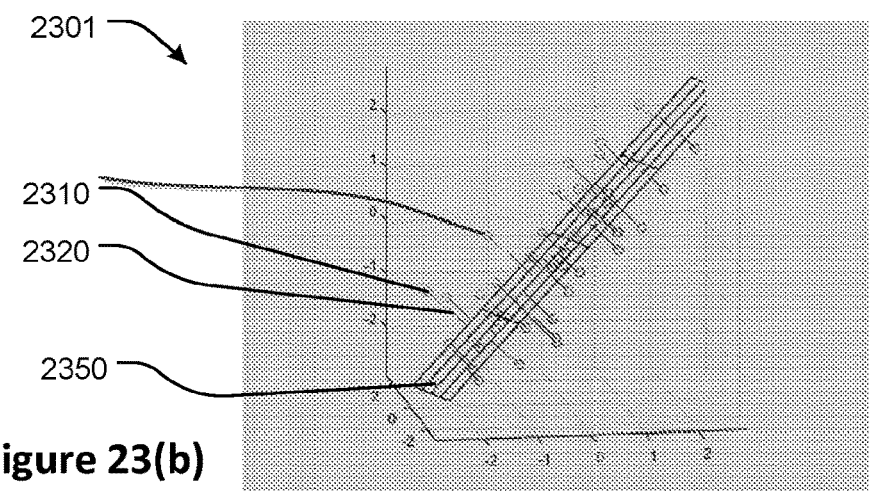
FIG. 23(b) is a plot of the result of the application of the plane estimation process and the orthogonal distances of the estimated plane to points shown in the plot of FIG. 23(a).

FIGS. 23(a) and 23(b) illustrate the application of PCA to a set of points 2310 in a three dimensional coordinate graph 2300. In coordinate graph 2301 in FIG. 23(b), the application of PCA enables identification of a place 2350 that minimizes the orthogonal distances 2320 between the points 2310 and the plane 2350. The plane estimation operations may be performed using pre-packaged functions in the Image Processing Library 922 by invoking them in the Gaming Monitoring Module 928. For example if OpenCV is used for implementing the contour estimation process, then the functions implemented by the class "cv::PCA" may be invoked to implement the plane estimation process, for example.

To estimate the value of chips, a traditional Euclidean distance of images can be used to classify chips. Chip template images will be collected in advance for comparison purpose. Then a k-nearest neighbours algorithm is used to assign the value of chips. However, there are some chip types with similar colour. To distinguish these types of chips, we further utilize the reflectivity of chip type from infrared image to classify them with the same k-nearest neighbours algorithm.

After having the table plane, distance from centre of each chip to that plane may be estimated to get the height of a stack of chips. The number of chips may also be estimated based on this height by linear or non-linear mapping. Calculating distance from a point to a plane can be derived as follows. Given a plane in 3-dimensional space $$ax+by+cz+d=0$$

and a point $x_0=(x_0; y_0; z_0)$, the normal vector to the plane is given by $$v = \begin{bmatrix} a \\ b \\ c \end{bmatrix}$$

then the distance from that point to the plane is calculated as $$D = \frac{|ax_0 + by_0 + cz_0 + d|}{\sqrt{a^2 + b^2 + c^2}}$$

An algorithm (or process) for card detection may be performed. There may be two type of games: card-based and non-card based games, for example. For card-based games, the algorithm (or process) in 1 can be used to detect cards and trigger game starting events. For roulette, dolly detection will be used to trigger game starting and ending events. When the Gaming Monitoring System detect a dolly (or position marker), it may infer that a game may have been started in a few seconds before, for example 20 to 30 seconds before the detection of the dolly. The dolly may stay in its position until removed by dealer. The removal of the dolly after initial detection may trigger a game ending event. Due to the reflective feature of dolly, an infrared image may be used instead of colour image to detect it.

Algorithm 1 Card detection algorithm (process):
1: Procedure CardDection(img). Input gray-scale image img
2: Apply Canny edge detection on img
3: Dilate canny output to remove potential holes between edge segments
4: Apply Canny edge detection on img
5: Find and approximate contours
6: Accept contours that meets following criteria:
   Area of contour must within area size of cards, for example between 40 to 70 cm$^2$ or between 50 to 60 cm$^2$
   Contour should have 4 vertices after approximation
   The cosine of the angle between joint edges must be small, for example between −0.2 to 0.2 or between −0.1 to 0.1.

Algorithm 2 Dolly detection algorithm (process):
1: procedure DollyDection(img). Input infrared image img
2: Apply global thresholding on img
3: Erode the output to remove small objects.
4: If there is any left object that meets size criteria, it will be a detected dolly.
5. Chip Detection To detect chips, we use adaptive thresholding to segment chips from background. The output binary will be eroded and dilated to remove small objects. After, all blobs that meet size-criteria will be detected as chips. This algorithm (or process) can be applied on both color and infrared images. Below sub-sections are re-views of techniques used and layout the detail of the algorithm (or process) is described in Algorithm 3.

Algorithm 3 Chip detection algorithm (or process) (process):
1: procedure CardDection(img). Input gray-scale image img
2: Apply adaptive thresholding on img
3: Erode and dilate the output to remove small objects.
4: If there is any left object that meets size criteria, it will be a detected chip.

Specific criteria such as the size criterion or the cosine of an angle criterion may be stored in the Configuration Module 940 as part of the Table Configuration 942.

Figure 26A:
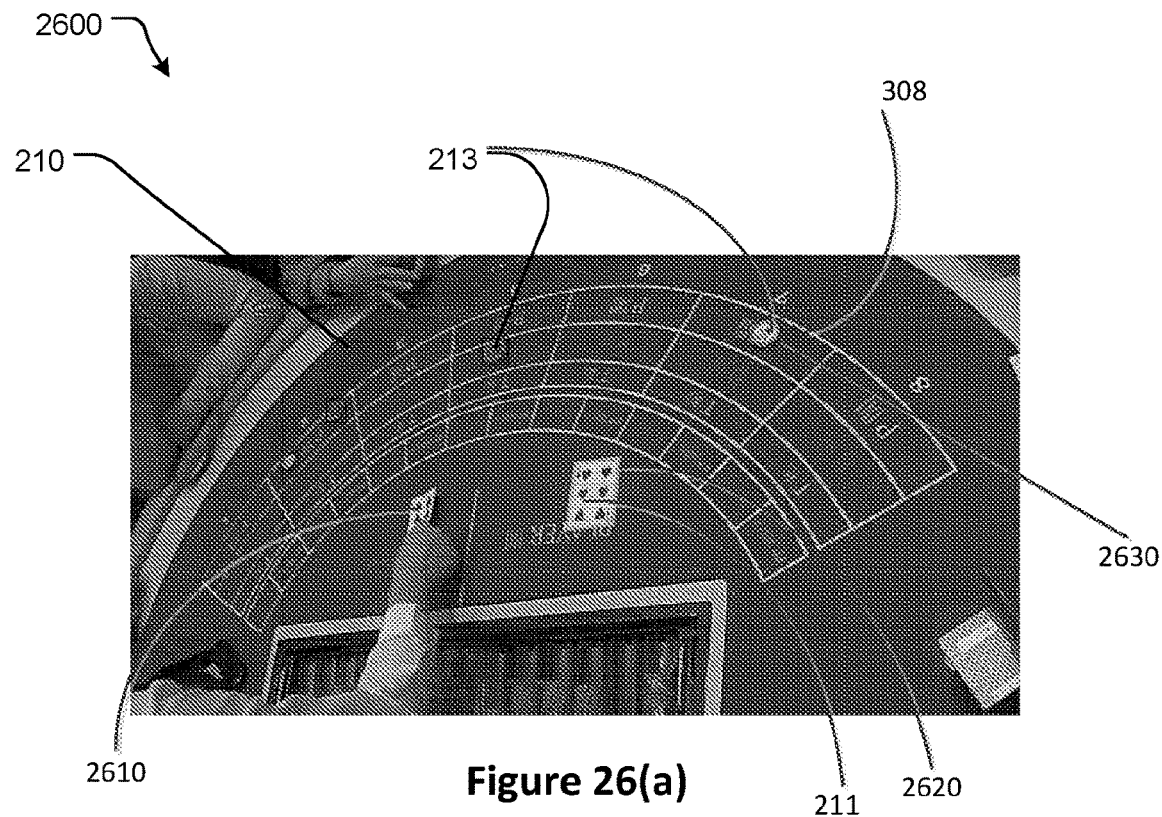
FIGS. 26(a) and 26(b) are image frames that illustrate the application of some card detection processes on another Gaming Table.
Figure 26B:
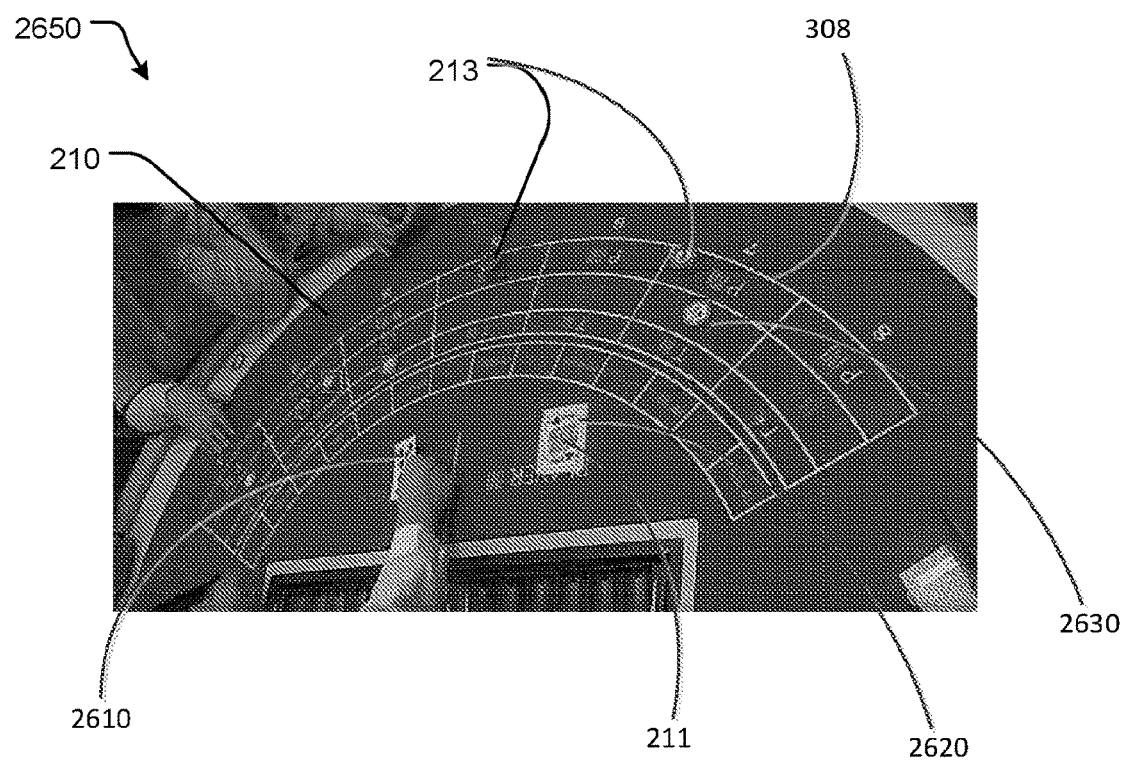

The chip height estimation algorithm may be seen in Algorithm 4:

Algorithm 4 Chip stack height estimation algorithm (process):
1: procedure ChipHeightEstimate(img). Input depth image img
2: Convert selected table points which are not chips to 3D coordinates
3: Fit these point to a plane called table plane
4: Find distance from each centre of chip stack to this plane to get chip stack height
5: Divide the height from the height of single chip to estimate number of chips in stack FIGS. 26(*a*) and 26(*b*) are image frame 2600 and 2650 respectively of an embodiment of a gaming table where card detection and chip detection is being performed. In FIG. 26(*a*) the boundary 2620 represents an area of the image frame where a card has been detected. The boundary 2630 represents an area of the image frame where a chip has been detected. The card 2610 has not been detected by the card detection algorithm (or process) because it has not been fully presented to the Depth Sensing Device and Camera 120 and is in the process of being dealt on the gaming table 210. In FIG. 26(*b*) a card 211 different from the card presented in FIG. 26(*a*) has been detected and is surrounded by the boundary 2620. Chips 213 in FIG. 26(*b*) are in different positions from the chips in FIG. 26(*a*) and have been detected with the boundary 2630.

Figure 27A:
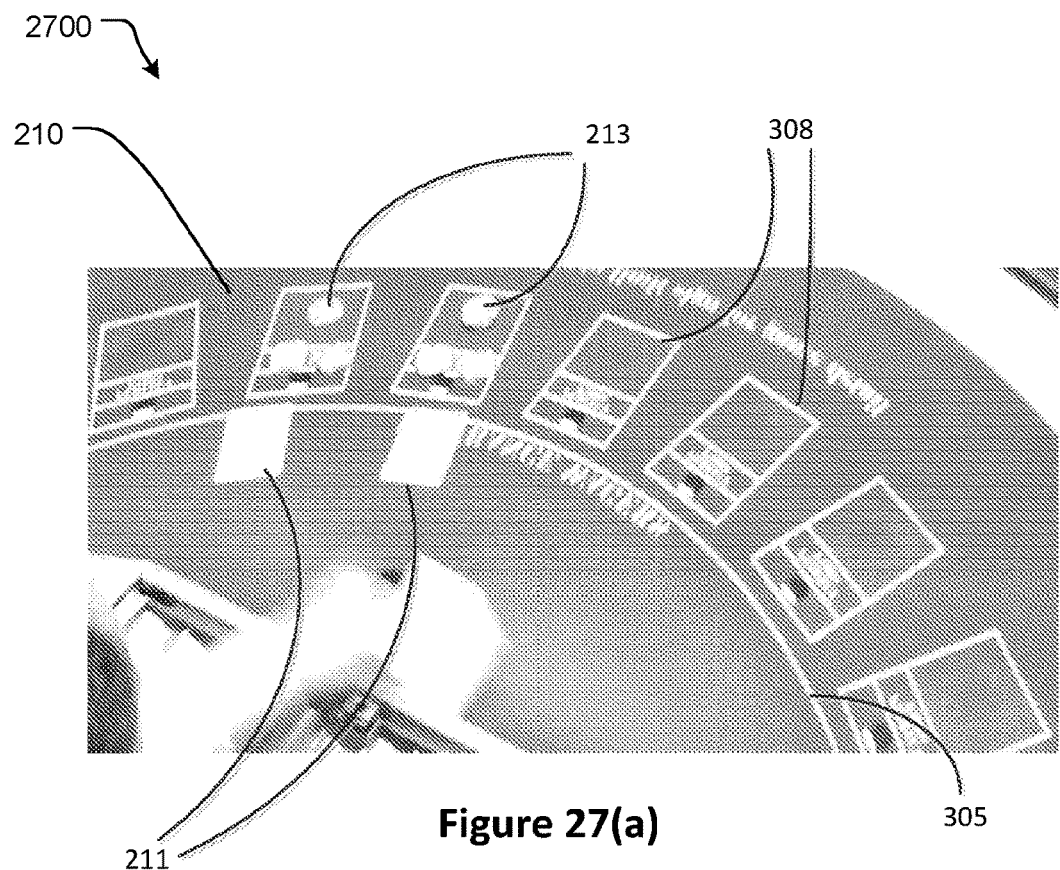
FIG. 27(a) is an image frames of another Gaming Table over which card and chip detection processes may be applied.
Figure 27B:
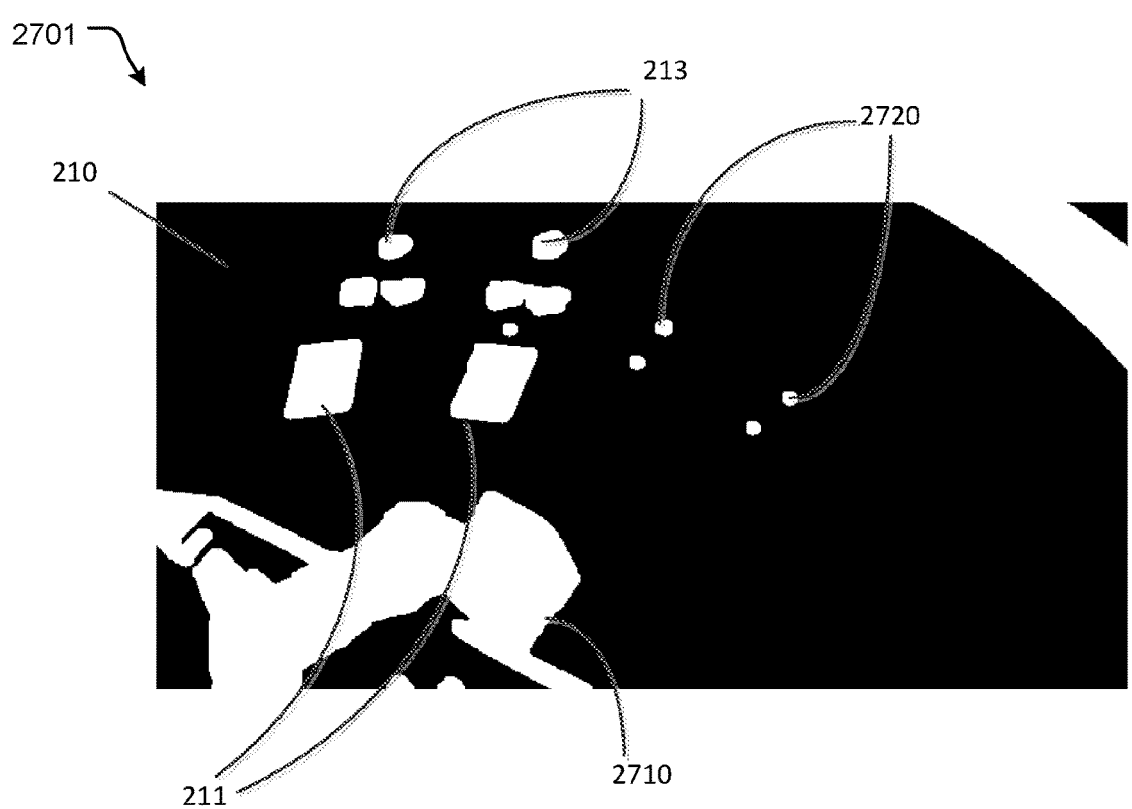
FIG. 27(b) is an image frame of the Gaming Table of FIG. 27(a) obtained by applying a thresholding technique to the image frame of FIG. 27(a).
Figure 28A:
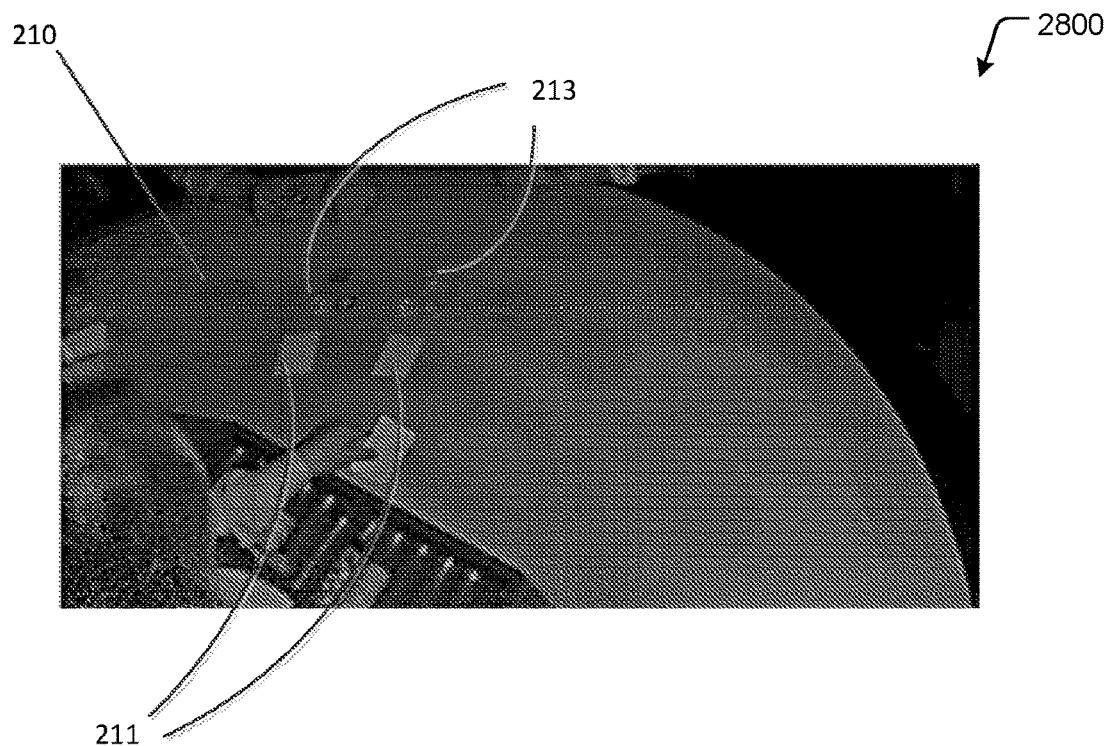
FIGS. 28(a) and 28(b) are image frames obtained by an infrared camera that illustrate the application of some card and chip detection processes on another Gaming Table.
Figure 28B:
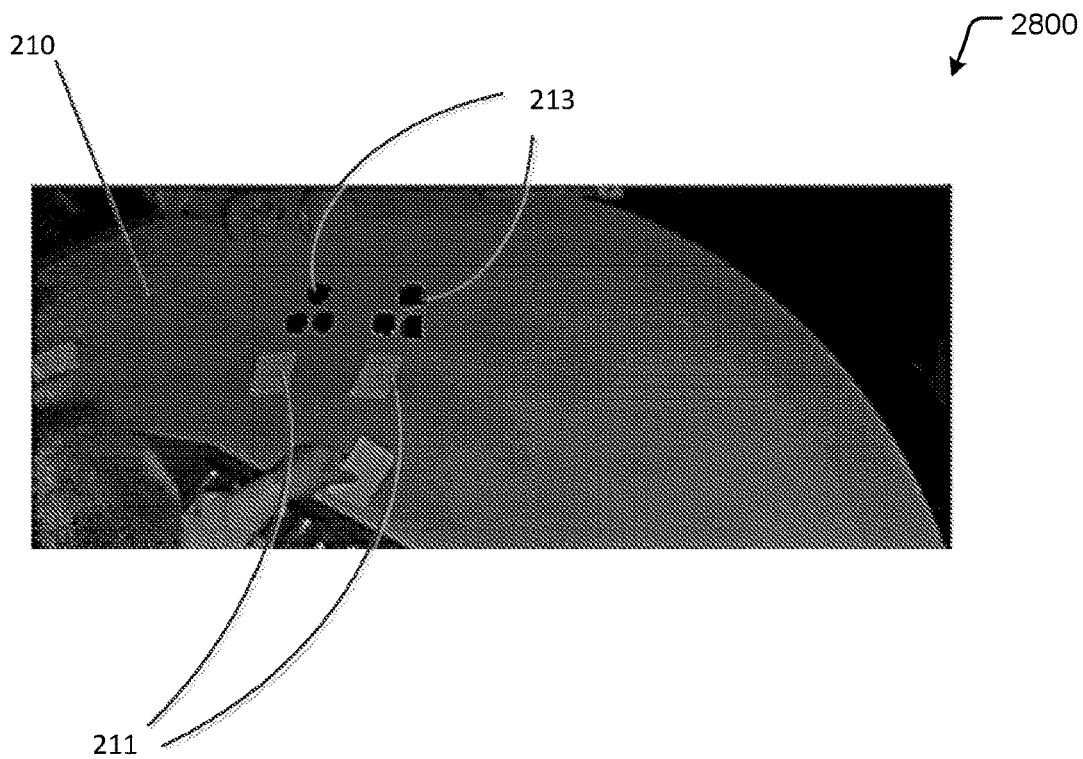
Figure 29A:
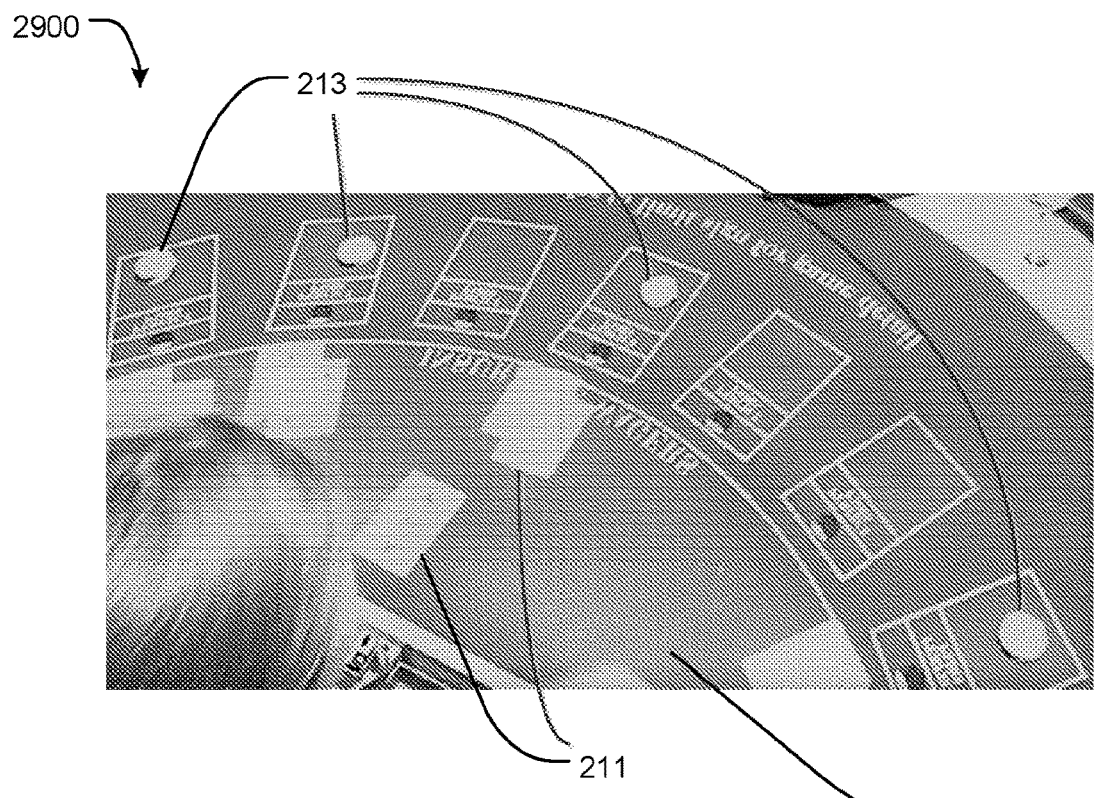
FIG. 29(a) is an image frame that may be an input to a Chip Detection Process.
Figure 29B:
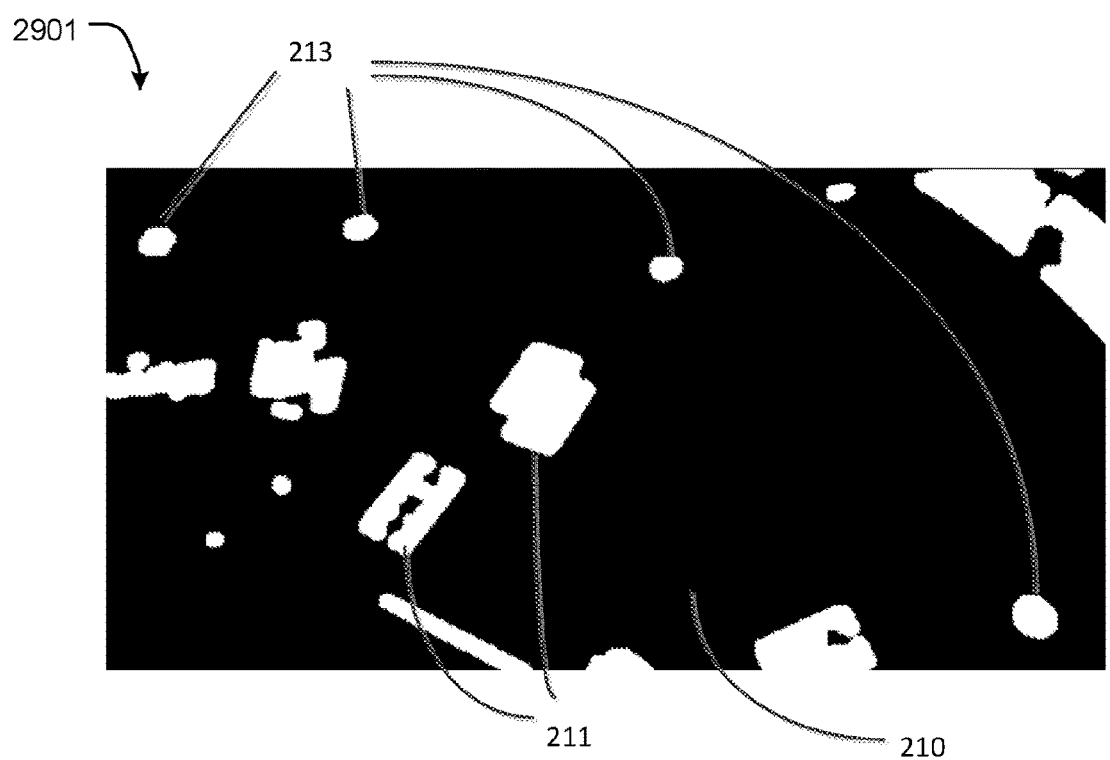
FIG. 29(b) is an image frame obtained by application of a binary thresholding operation on the image frame of FIG. 29(a).
Figure 29C:
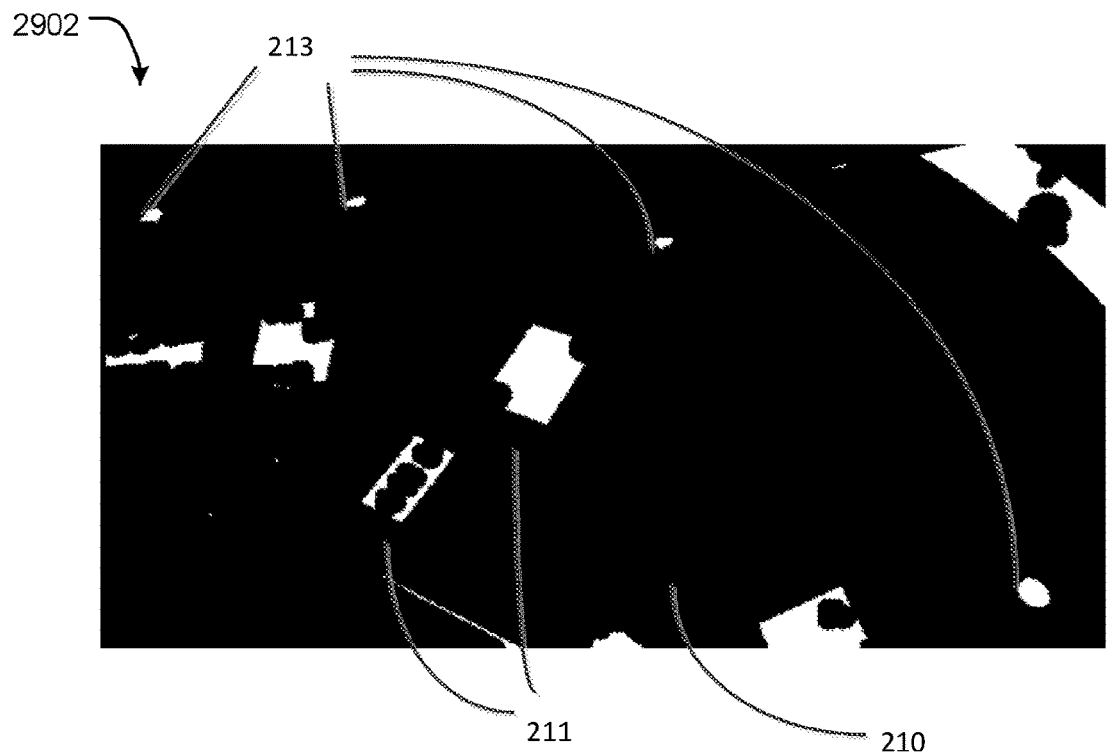
FIG. 29(c) is an image frame obtained by application of an erosion operation on the image frame of FIG. 29(b).
Figure 29D:
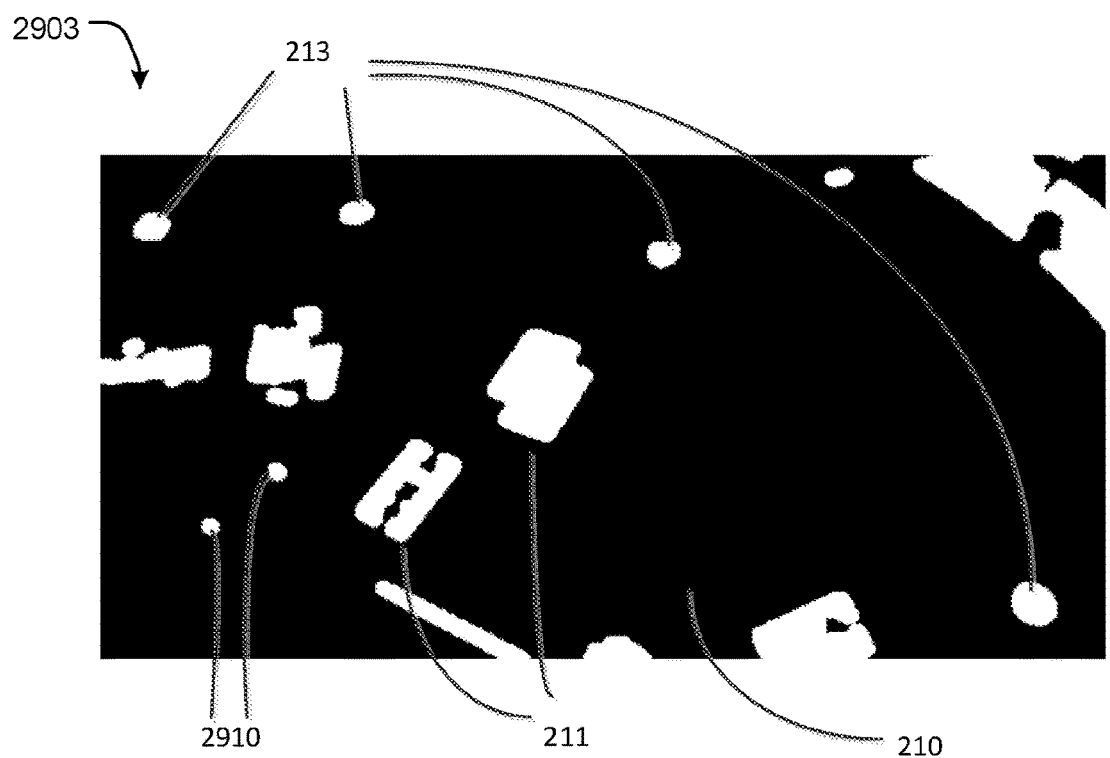
FIG. 29(d) is an image frame obtained by application of a dilation operation on the image frame of FIG. 29(c).
Figure 29E:
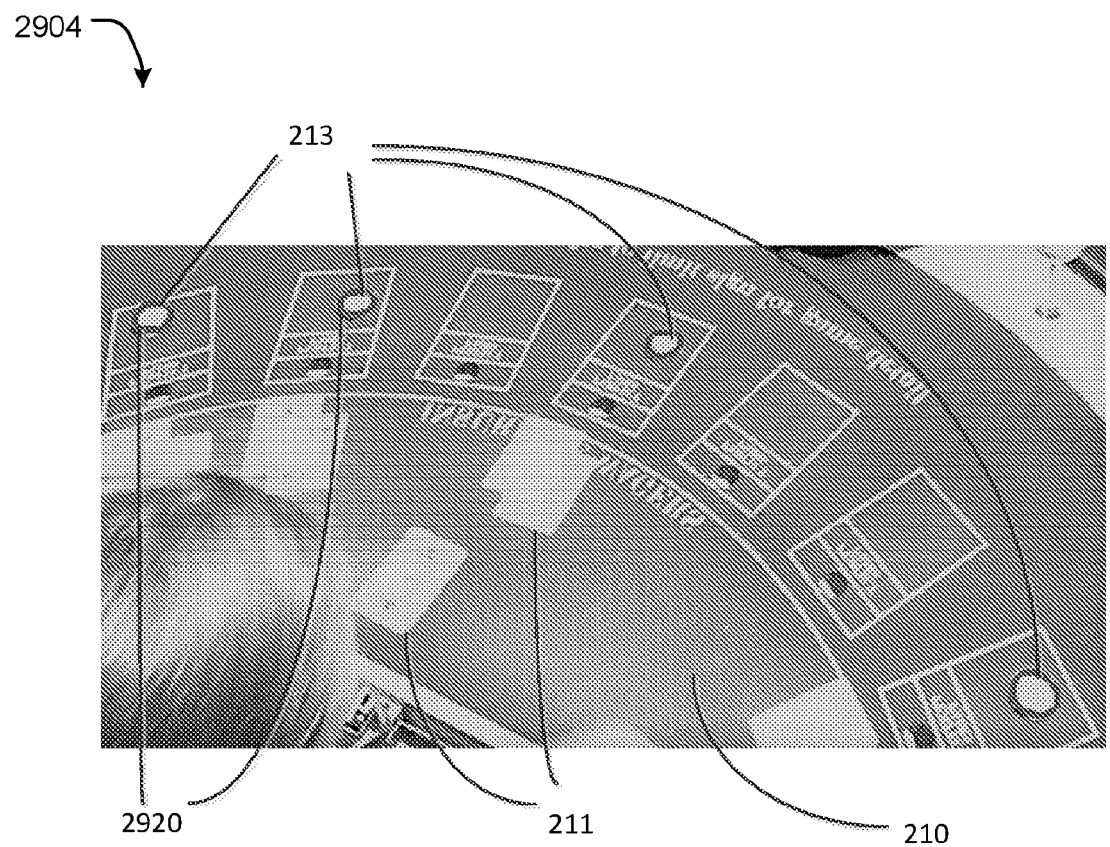
FIG. 29(e) is an image frame that illustrates the results of application of a Chip Detection Process on the input image frame of FIG. 29(a).

FIGS. 27(*a*) and 27(*b*) represent image frames 2700 and 2701 respectively of an embodiment of a gaming table where card detection and chip detection is being performed. FIG. 27(*b*) is the result of application of any one of the binary thresholding techniques to FIG. 27(*a*). Shape 2710 in FIG. 27(*b*) may be potential false positive detections for cards 211. These false positives may be eliminated by the step 6 of Algorithm 1 that compares the area of a shape with the expected area of a card. Similarly shapes 2720 may be eliminated as false positive detections for chips 213 by a comparison of the area of the shapes 2720 and the expected area of chips 213. FIG. 28(*a*) represents an infrared image of an embodiment of a gaming table 2800 with gaming objects such as cards 211 and chips 213. In FIG. 28(*b*) the chips 211 have been identified by the Chip Detection Algorithm 3 and greyed out to indicate the detection. Results of the application of game object detection processes on colour image frames may be combined with infrared image frames to improve the accuracy of the detection and estimation of chip stack height.

FIGS. 29(*a*) to 29(*e*) illustrate the application of the Chip Detection Process to an image frame 2900 according to some embodiments. An image frame 2900, may be captured by the Depth Sensing Device and Camera 120. FIG. 29(*b*) is an image frame 2901, obtained by application of a binary thresholding operation to the input image frame 2900 of FIG. 29(*a*). Image frame 2902 of FIG. 29(*c*) is obtained by application of an erosion operation to the image frame 2901 of FIG. 29(*b*). FIG. 29(*d*) is an image frame 2903, obtained by application of a dilation operation to the input image frame 2902 of FIG. 29(*c*). The combination of erosion and dilation operations helps reduce noise from the input image frame and makes the observable features such as chips more prominent. FIG. 29(*e*) is an image frame 2904, that illustrates results of the chip detection process. Detected chips 213 are identified by the outline 2920. Shapes 2910 of FIG. 29(*d*) are not identified as chips because they may not meet a criteria as part of the process of chip detection. The criteria may be a size range for a shape to be detected as a chip, or other similar distinguishing criteria.

Figure 24:
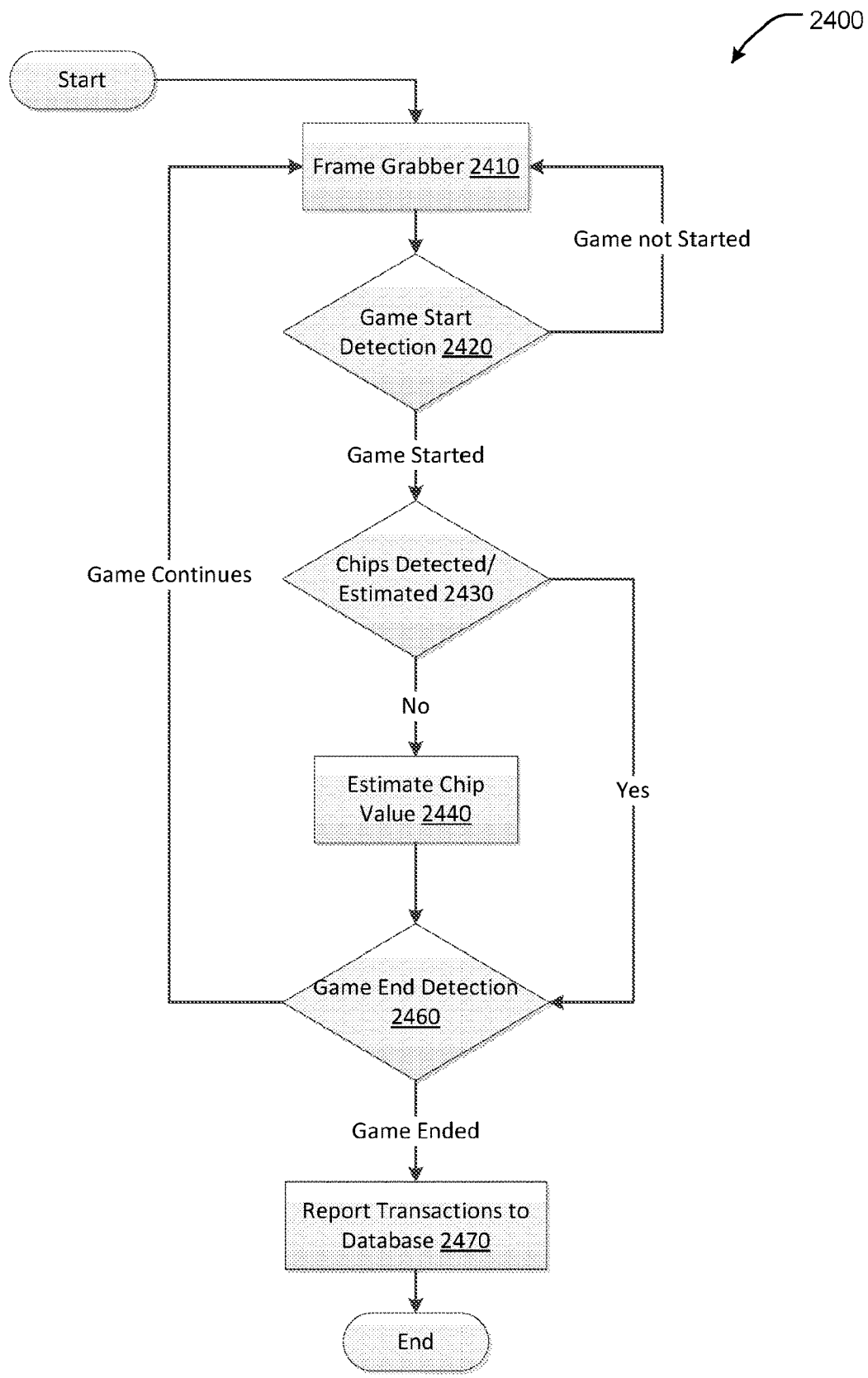
FIG. 24 is a flowchart of a Game Monitoring System according to some embodiments.

Some embodiments follow the steps in the flowchart 2400 in FIG. 24 to monitor gaming events of gaming tables. The Frame Grabber 2410 collects 3 streams of frames, comprising colour video frames, depth frames, and infrared frames. The raw colour images have 1920×1080 resolution. The depth stream provides a depth value of every point in the visible area. The depth value is the distance of the observed point from the sensor. The Infrared stream brings the ability to view more clearly into darker portion of the field of view.

Game Start Detection occurs at 2420. To detect when the game starts, the some embodiments use cards as a trigger. For games without cards like Roulette, a dolly may be detected when the game finishes and a game start event is triggered back in $n^{th}$ frame.

Chip Detection and Estimation occurs at 2430. This is the process of detecting the location of chips, estimating chip cash value and how many chips in that chip stack. The algorithm (or process) is based on adaptive thresholding and morphology operation. This could be applied on both colour and infrared images.

Chip value estimate is performed at 2460 by using template matching in colour images and reflective features of each chip types in infrared image. Chip height estimate is then calculated based on distance between the top surface of chip and the table plane.

Game Ending Detection 2460 is the process opposite to game starting detection. When the dealer clears out the cards, it triggers the game ending event. For roulette, the detection of removal of the dolly will trigger this event.

Figure 25:
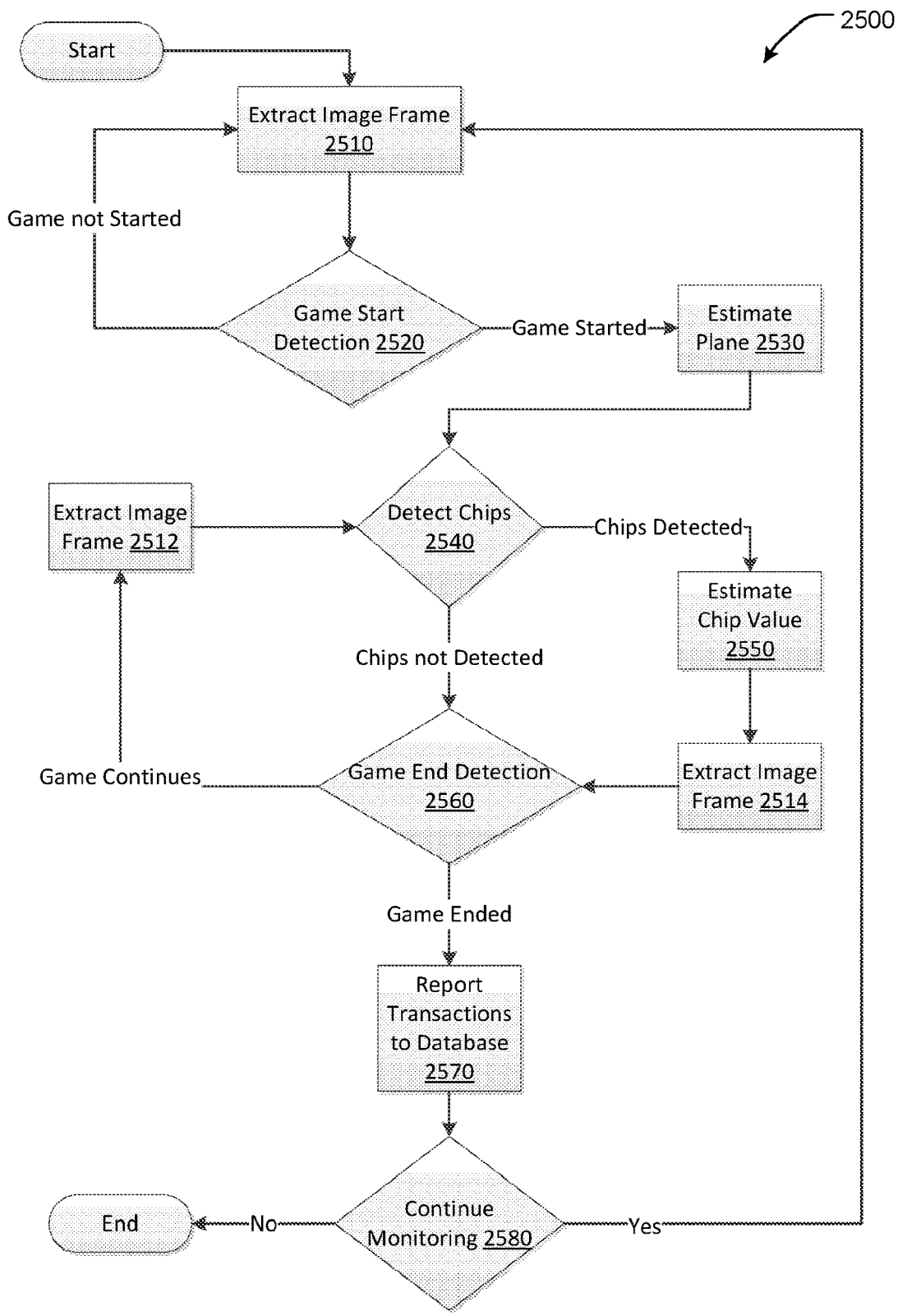
FIG. 25 is flowchart of a Game Monitoring System according to further embodiments.

Game Start and End Detection:

FIG. 25 represents a flowchart of a Gaming Monitoring Process 2500 that some embodiments may implement to monitor events on gaming tables. The two significant steps in the process are Game Start Detection 2520 and Game End Detection 2560. The specific nature of the events that define game start and end triggers may be stored in the Game Start and End Trigger Configuration 944 and referred to by the Gaming Monitoring Module 928 to estimate of a game has started or ended on a table. For example, for a table designated for the game of blackjack, the presence of one or more cards in an image frame extracted in a step 2510 may be treated as the start of a game. Likewise, after the start of a game, the absence of any cards in an image frame may be treated as the end of a game for the purpose of Game End Detection 2560. For games not based on cards such as roulette, the presence of other game objects such as a dolly may be used the start and end triggers for a game. The specific shape and nature of a game start or end trigger initiating game object may be saved in the Game Start and End Trigger Configuration 944 of the Configuration Module 940 of the Computing Device 130. These configurations may be managed through the Web Application Server 160 on the Database Server 150 and be subsequently transferred to the Computing Devices 130 through the Table Configuration Propagator Module 1140.

Overall Monitoring Process:

The Gaming Monitoring Process 2500 starts with a step of Extraction of an Image Frame 2510. This step comprises capturing an image of a Gaming Environment 110, by a Depth Sensing Device and Camera 120 and transmission of the captured image via the link 107 to the Computing Device 130 available for analysis by the Gaming Monitoring Module 928. The images may be captured in a colour format or in infrared format or both or any other format the Depth Sensing Device and Camera is capable of capturing an image in. Next step 2520 comprises the detection of the start of a game by application of the Algorithm 1: Card Detection Algorithm or Algorithm 2: Dolly Detection Algorithm, for example. If the beginning of a game is detected, them a step of automatically Estimating the Plane of the gaming table or playing surface 2530 is performed. Step 2530 may be performed using PCA discussed above and the results may be stored in the memory of the Computing Device 130.

A next step 2540 comprises detection of chips. This step may be performed through Algorithm 3: Chip Detection Algorithm. If a chip is detected, then a next step 2550 may be to estimate the value of the stack of chips in the image. This step is performed by implementing Algorithm 4: Chip stack height estimation algorithm or process which may be implemented in real-time or near real-time. Part of the process may also include automatically estimating the colour of a chip or wager object on top of a stack and retrieving from the Table Configuration module 942 the value associated with the colour. The retrieved value may be multiplied with the estimated number of wager objects or chips in the stack to automatically estimate the value of the entire stack. The results of the application of this algorithm or process may be stored in the memory of the Computing Device 130 and recorded as an event or a transaction. The detected stack of chips is also associated with a region of interest on the table to distinguish it from other stacks of chips on the same gaming table.

Multiple stacks of chips or wager objects on a single region of interest may be separately detected and the estimated values of each stack may be recorded separately with a unique identifier of the region of interest. Alternatively, the value of multiple stacks of chips on a single region of interest may be aggregated and recorded with a unique identifier of the region of interest. The height of multiple stacks of chips may be estimated in one iteration, or in several iterations of the implementation of Algorithm 4. After estimating the value of the stack of chips, another image frame is grabbed through step 2514 and the Game End Detection step 2560 is performed. Game End Detection may be performed by looking for an absence of any cards or by the absence of a dolly on the gaming table in the image frame grabbed at step 2514, for example. If the Game End is not detected, then another image frame is grabbed at step 2512 and this is followed by another iteration of Detection of Chips at step 2540.

If the end of a game is detected, then in step 2570, the event data captured during the monitoring process is sent to the Database Server 150 to be stored as Gaming Event Data 1124 by via the Message Broker Server 140. In other embodiments, the step of reporting transaction to the Database Server 150 may occur as the events are being detected in real-time or near real-time manner. This event data may comprise timestamps the event occurred, the regions of interests over which chips were detected, the estimated value of stacks of chips, game start and end times and other relevant parameters captured by the Gaming Monitoring Module 928. After reporting transactions to the Database Server, the Gaming Monitoring System may continue to monitor the gaming table and await the beginning of the next game at steps 2510 and 2520. Examples of some records of event data captured during a game are as follows:

Game Record 1<Table ID: R.2745; Game ID: 17.0.20170421150202; Game Start Time: 2017-04-21 15:02:02; Game End Time: 2017-04-21 15:04:02>

Game Object Record 1<Table ID: R.2745; Game ID: 17.0.20170421150202; Region of Interest ID: Player-1, Wager Object Value: 5; Wager Object Count: 5>

Game Object Record 2<Table ID: R.2745; Game ID: 17.0.20170421150202; Region of Interest ID: Player-2, Wager Object Value: 10; Wager Object Count: 2>

In the above examples of game event data, the Game Record 1 with a unique identifier "Game ID: 17.0.20170421150202" is associated with a unique gaming table or playing surface identified by the unique identifier "Table ID: R.2745". The Game Record also comprises game start and end time stamp values. Associated with Game Record 1 are two game object records: Game Object Record 1 and Game Object Record 2. Game Object Record 1 represents an estimate of 5 wager objects of value 5 detected in a region of interest with a unique identifier "Player-1". Game Object Record 2 represents an estimate of 2 wager objects of value 10 detected in a region of interest with a unique identifier "Player-2".

Multi Frame Processing:

The approaches to game object detection described above take into account single frames or snapshots to perform any processing. The results produced by this approach can be further improved to avoid false positives and achieve greater accuracy through Multi Frame Processing techniques. This technique comprises processing every frame for game object detection and chip height estimation and logging of results obtained after every processing iteration. Certain processing rules may be applied to the logged results to improve the game object detection and chip stack height estimation steps. For example, averaging of chip stack values estimated over several frames may be used to compensate for a few frames with erroneous observations. Also, in games where the first card detection may be delayed, the Gaming Monitoring Module 928 may traverse back in time to a captured frame perform card detection again to identify the beginning of a new game retrospectively. Moving objects triggering a game may be reduced by detecting cards in a plurality of regions of interest and only treating a game as initiated if a certain ratio of regions of interest are detected with cards; for example 3 out of 8 regions, or 2 out of 12 regions.

Figure 30:
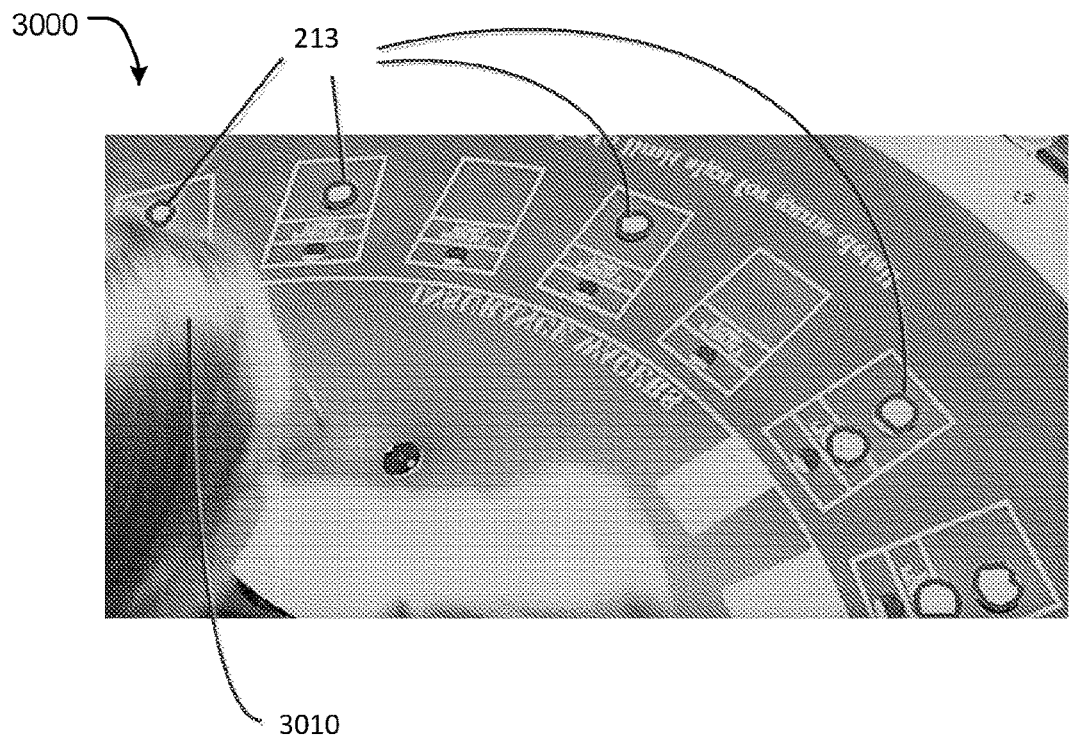
FIG. 30 is an image frame that illustrates the results of application of a Chip Detection Process on a Gaming Table wherein part of the view of a gaming table is obstructed.
Figure 31:
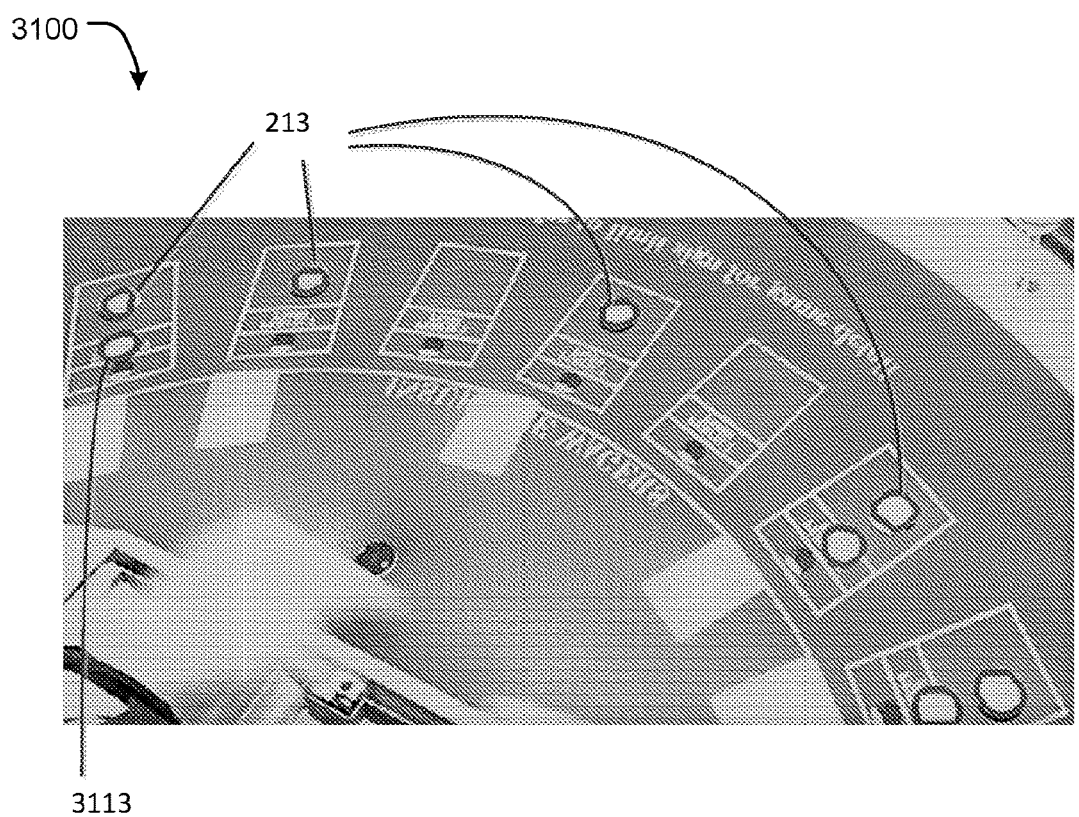
FIG. 31 is an image frame that illustrates the results of application of a Chip Detection Process to the Gaming Table of FIG. 30(a) obtained after the obstruction in FIG. 30(a) is not in the image frame.

Multi Frame Processing techniques may also be employed to detect game objects that may be temporarily obstructed from the view of the Depth Sensing Device and Camera 120. FIG. 31 is an image frame 3000 that represents a view of a Gaming Table with an obstruction in the form of a dealer's head 3010. FIG. 31 is an image frame 3100 that represents a view the Gaming Table of FIG. 30 taken a few seconds before or after the image frame 3000. Image frame 3100 does not have the obstruction 3010 and the application of a chip detection algorithm results in identification of a chip 3113 that was not previously detected in the image frame 3000. The combination of the results obtained by the application of game object detection processes on image frames that may have been obtained over a small period of time, such as over 2-4 seconds or over 1-2 seconds or within a second, may be used to improve the overall accuracy of a game object detection process.

Figure 32:
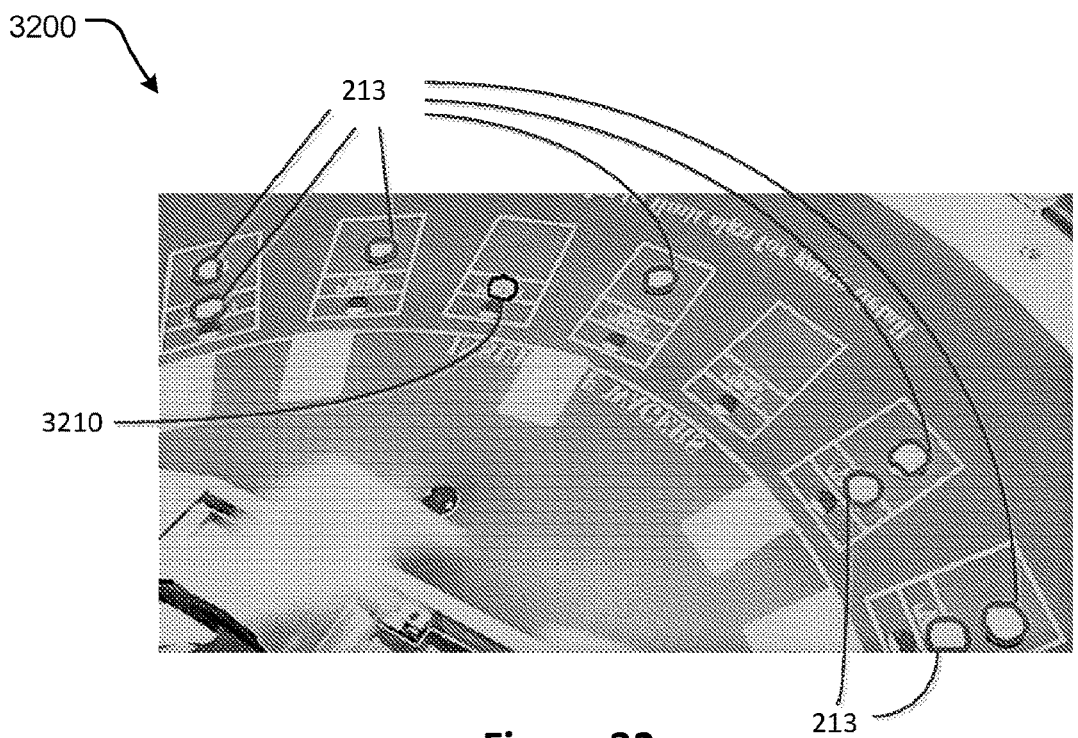
FIG. 32 in an image frame that illustrates the results of application of a Chip Detection Process to a Gaming Table, wherein the input image frame is based on an image captured by a visual image camera.
Figure 33:
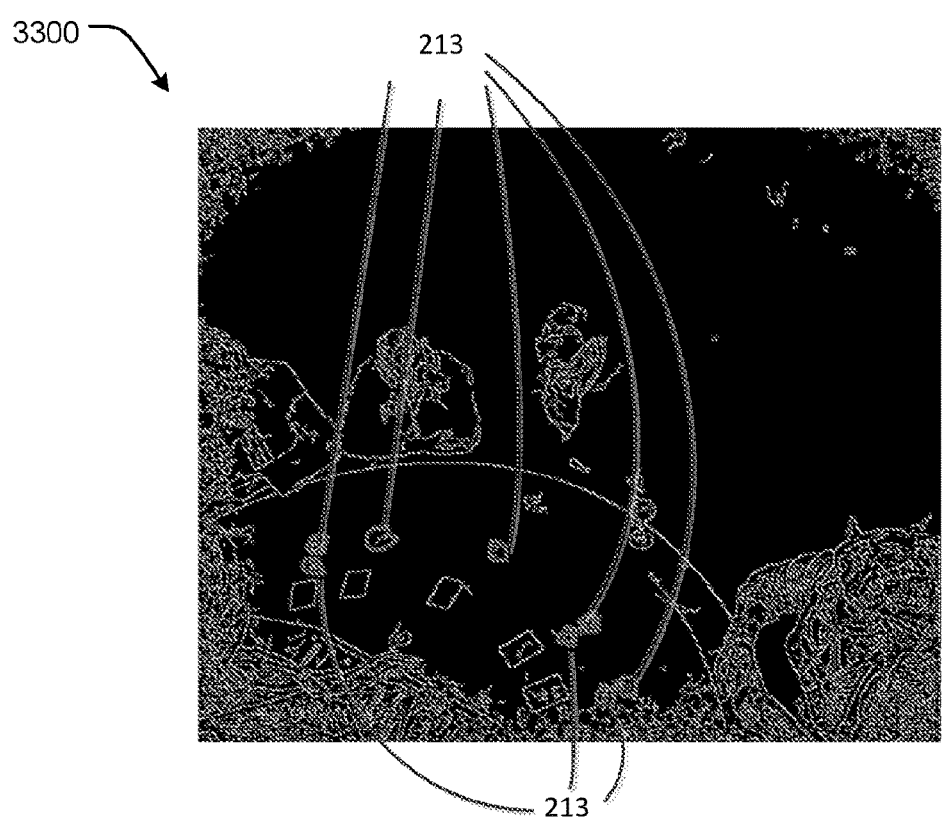
FIG. 33 an image frame that illustrates the results of application of a Chip Detection Process to the Gaming Table of FIG. 32, wherein the input image frame is based on an image captured by a infrared camera.

The Multi Frame Processing Technique described above may also be extended to image frames obtained from different sources, such as images obtained from a visual image camera and an infrared camera or images obtained from more than one Depth Sensing Devices and Camera 120, for example. FIG. 32 is an image frame 3200 obtained from a visual image camera that may be a part of a Depth Sensing Device and Camera 120. In this image 3200, the application of a chip detection process may produce a false positive result by identifying a chip 3210. FIG. 33 is an image frame 3300 obtained from an infrared camera after image pre-processing steps and edge and contour detection techniques have been applied to a raw image frame. The application of chip detection processes in the image frame 3300, does not produce the false positive result produced in image frame 3200. Thus, a combination of results obtained by application of game object detection processes on multiple different (types of) image frames may be effective in some embodiments to improve the accuracy of game object detection results.

Figure 34:
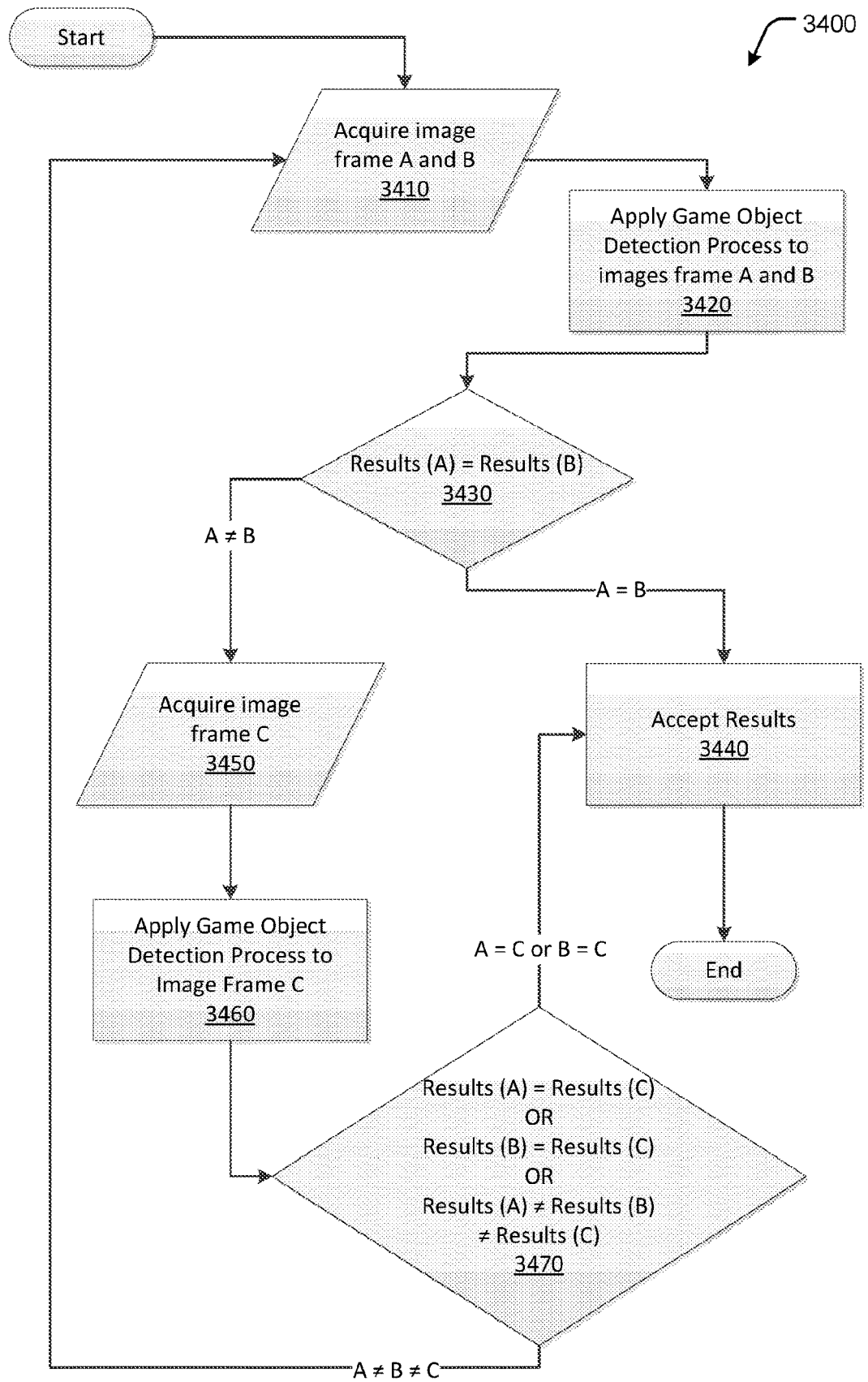
FIG. 34 is a flowchart of a Multi Frame Processing Technique according to some embodiments.

The flowchart of FIG. 34 is an example of an implementation of a Multi Frame Processing technique 3400 that some embodiments may implement. Step 3410 comprises acquiring two image frames A and B through the Depth Sensing Device and Camera 120. The image frames A and B may be from a visual image camera or an infrared camera and may be separated in time of capture by a few milliseconds, for example. Alternatively, the image frames A and B may have been obtained from a visual image camera and an infrared camera respectively at the same point of time, for example. Both image frames A and B are taken from substantially the same perspective and represent the same gaming table or playing surface.

Step 3420 comprises the application of a game object detection process to each region of interest in image frames A and B. The game object detection process may be a card detection process, or a chip or wager object detection process, for example Results obtained from a game object detection process for a given region of interest may include one or more of: identification of the presence of a game object in a region of interest, a number of game objects in a region of interest, a number of distinct groups of game objects within the region of interest, a number of game objects in each identified group, and/or colour of a game object, for example. If the game object detection process does not identify a game object in a particular region of interest, then the result of that process may be a null result (no result reported) or a result indicating zero game objects detected. Specific pre-defined regions of interested may be designated for identification of the presence of a specific game object. For example, a pre-defined region of interest may be designated for identification of game cards as part of the game object detection process. Other pre-defined regions of interest may be designated for identification of wager objects as part of the game object detection process.

Step 3430 comprises a comparison of the results obtained by the application of the game object detection process on image frames A and B at step 3420. If the results obtained from image frame A and B match; for example if location, number and colour of game objects detected in image frame A and B are identical; then in step 3440 the obtained results are accepted and reported as a game event by the Computing Device 130.

If the results obtained from image frame A and B do not match, either in terms of location or number or colour of game objects detected, then in step 3450 an image frame C is acquired from the Depth Sensing Device and Camera 120. Image frame C may be captured from a different source, visual image camera or infrared camera, for example; or may have been taken at a point of time separated from the time at which image frames A or B were acquired by a few milliseconds, for example. All images A, B and C are taken from substantially the same perspective and represent the same gaming table or playing surface.

In step 3460, the game object detection process applied at step 3420 is also applied to image frame C. At step 3470, the results obtained by application of the game object detection process on image frames A, B, and C, at steps 3420 and 3460 are compared. If results obtained from image frame A match results obtained from image frame C, then the results obtained from image frame B are discarded as an anomaly and results obtained from image frame A or C are accepted at step 3440. If results obtained from image frame B match results obtained from image frame C, then the results obtained from image frame A are discarded as an anomaly and results obtained from image frame B or C are accepted at step 3440. If, none of the results obtained from image frames A or B or C matchup, then a fresh set of images may be acquired at step 3410 to obtain better game object detection results.

In this description of some embodiments, reference is made to diagrams that are certain abstractions of the software and hardware system that combine to form the embodiments. These abstractions are to be understood as such, and are presented here to help understand the embodiment and enable their reproduction or implementation. The division of the system into blocks is in accordance with functions of the system and is presented as such with the understanding that in an implementation, one need not have software or hardware component that are logically or physically divided in such a manner. Likewise, the physical equipment installation is but one possibility, since the functions of the system can be distributed differently without departing from the disclosure. For convenience, the system and specific examples are explained in the context of the games of Blackjack, Baccarat and Roulette. It is understood that some or all of the components of the system can be applied to other table games as well.

Some embodiments may further take an initial background image for the camera view. This background image could be of an empty table. This image may be warped to a birds-eye view based on key features within the image (the table layout). This new image may be referred to as the normalized background image and may thereafter be used for background abstraction.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method of monitoring game play on a table surface of a gaming table, the method comprising:
   analysing in real time by a computing device in communication with at least one camera configured to capture images of the table surface, captured images of the table surface to identify a presence of a game object in any one of a plurality of first regions of interest on the table surface;
   in response to the game object being identified as present in the any one of a plurality of first regions of interest, recording a time stamp for a game event;
   transmitting, by the computing device, game event data to a server, the game event data including the time stamp, an indication of the game event and an identifier of the any one of a plurality of first regions of interest;
   capturing depth of field images of the table surface using at least one depth sensor; and
   wherein the analysing includes
      identifying one or more groups of wager objects in one or more second regions of interest,
      estimating a height of each of the one or more groups of wager objects with respect to the table surface based on the captured depth of field images, and
      estimating a number of wager objects present in each group of wager objects based on the estimated height of each of the one or more groups of wager objects with respect to the table surface; and
   wherein the one or more groups of wager objects are different from the game object.

2. The method of claim 1, wherein the game object is a game card or a position marker.

3. The method of claim 1, wherein the analysing further comprises identifying a colour of an upper most wager object among each group of wager objects.

4. The method of claim 3, further comprising:
   automatically estimating a wager amount associated with each second region of interest in which at least one wager object is identified, wherein
      the automatically estimating is based on the identified colour of the upper-most wager object among each group of wager objects and the estimated number of wager objects in each group of wager objects in a respective second region of interest.

5. The method of claim 1, wherein the analysing in real time by a computing device comprises:
   detecting one or more edges corresponding to the game object; and
   approximating a contour of the one or more edges to a contour model to identify the game object.

6. A non-transitory computer-readable storage medium storing instructions that when executed by a computer cause the computer to perform the method of claim 1.

7. A method of monitoring game play on a table surface of a gaming table, the method comprising:
   analysing in real time by a computing device in communication with at least one camera configured to capture images of the table surface, captured images of the table surface to identify a presence of a game object in any one of a plurality of first regions of interest on the table surface;
   in response to the game object being identified as present in the any one of a plurality of first regions of interest, recording a time stamp for a game event;
   transmitting, by the computing device, game event data to a server, the game event data including the time stamp, an indication of the game event and an identifier of the any one of a plurality of first regions of interest;
   wherein the captured images include multi-spectral images; and
   wherein the analysing includes multi frame processing of the multi-spectral images to identify the presence of the game object in any one of the plurality of the first regions of interest or second regions of interest on the table surface.

8. A system of monitoring game play on a table surface of a gaming table, the system comprising:
   at least one camera configured to capture images of the table surface; and
   a computing device in communication with the at least one camera, said computing device configured to analyse, in real time, captured images of the table surface to automatically identify a presence of a game object in any one of a plurality of first regions of interest on the table surface;
   wherein said at least one camera includes a depth sensing device to communicate, to the computing device, depth data of wager objects with respect to the table surface;
   wherein said computing device is configured to
      identify one or more groups of wager objects in one or more second regions of interest,
      estimate a height of each of the one or more groups of wager objects with respect to the table surface based on the depth data of wager objects with respect to the table surface, and
      estimate a number of wager objects present in each group of wager objects based on the estimated height of each of the one or more groups of wager objects with respect to the table surface; and
   wherein the one or more groups of wager objects is different from the game object.

9. The system of claim 8, wherein the game object is a game card or a position marker.

10. The system of claim 8, wherein the computing device is further configured to identify a colour of an upper-most wager object among each group of wager objects.

11. The system of claim 10, wherein
the computing device is further configured to automatically estimate a wager amount associated with each second region of interest in which at least one wager object is identified, and
the automatic estimate is based on the identified colour of the upper-most wager object among each group of wager objects and the estimated number of wager objects in each group of wager objects in a respective second region of interest.

12. The system of claim 8, wherein the computing device is configured to analyse, in real time, the captured images of the table surface by
detecting one or more edges corresponding to the game object; and
approximating a contour of the one or more edges to a contour model to identify the game object.

13. A system of monitoring game play on a table surface of a gaming table, the system comprising:
at least one camera configured to capture images of the table surface; and
a computing device in communication with the at least one camera, said computing device configured to analyse, in real time, captured images of the table surface to automatically identify a presence of a game object in any one of a plurality of first regions of interest on the table surface;
wherein the captured images include multi-spectral images; and
wherein the computing device is configured to perform multi-frame processing of the multi-spectral images to identify the presence of the game object in any one of the plurality of the first regions of interest or second regions of interest on the table surface.

* * * * *